(12) United States Patent
Yu et al.

(10) Patent No.: US 7,267,810 B2
(45) Date of Patent: Sep. 11, 2007

(54) METHOD OF SYNTHESIZING COLLOIDAL NANOCRYSTALS

(75) Inventors: Kui Yu, Kanata (CA); John Ripmeester, Ottawa (CA)

(73) Assignee: National Research Council of Canada, Ottawa, ON (CA)

( * ) Notice: Subject to any disclaimer, the term of this patent is extended or adjusted under 35 U.S.C. 154(b) by 144 days.

(21) Appl. No.: 11/024,823

(22) Filed: Dec. 30, 2004

(65) Prior Publication Data

US 2005/0238568 A1 Oct. 27, 2005

Related U.S. Application Data

(60) Provisional application No. 60/532,887, filed on Dec. 30, 2003, provisional application No. 60/544,325, filed on Feb. 17, 2004.

(51) Int. Cl.
- *C01B 17/20* (2006.01)
- *C01B 19/04* (2006.01)
- *C01G 11/00* (2006.01)

(52) U.S. Cl. .................. 423/508; 423/509; 423/561.1; 423/566.1; 423/592.1; 977/813; 977/773; 977/774; 977/775; 977/824; 977/825

(58) Field of Classification Search ................ 423/508, 423/509, 561.1, 566.1, 592.1; 977/813, 814, 977/773, 775, 774, 824, 825

See application file for complete search history.

(56) References Cited

U.S. PATENT DOCUMENTS

| 5,985,173 A | * | 11/1999 | Gray et al. ........... 252/301.4 R |
| 6,106,609 A | * | 8/2000 | Yang et al. ................... 117/11 |
| 6,821,337 B2 | | 11/2004 | Bawendi et al. |

FOREIGN PATENT DOCUMENTS

| WO | WO 02/29140 A1 | 4/2002 |
| WO | WO 03/012006 A1 | 2/2003 |

OTHER PUBLICATIONS

Peng, Adam Z. et al: Formation of High-Quality CdTe, CdSe, and CdS Nanocrystals Using CdO as Precursor, American Chemical Society, 2001, p. 183-184, vol. 123, United States of America.

Murray, C. B. et al: Synthesis and Characterization of Nearly Monodisperse CdE (E= S, Se, Te) Semiconductor Nanocrystallites, American Chemical Society, 1993, pp. 8706-8715, vol. 115, United States of America.

* cited by examiner

*Primary Examiner*—Timothy C. Vanoy
(74) *Attorney, Agent, or Firm*—Marks & Clerk; Richard J. Mitchell

(57) ABSTRACT

A method of making nanocrystals involves adding a chalocogen source to a hot solution of a metal-containing non-organometallic compound, such as CdO, in a first ligand solvent, such as TOP, and preferably subsequently cooling the resulting mixture to a lower temperature to grow the nanocrystals at said lower temperature. The method can involve either one ligand or two-ligand systems.

23 Claims, 24 Drawing Sheets

METHOD OF SYNTHESIZING COLLOIDAL NANOCRYSTALS

CROSS REFERENCE TO RELATED APPLICATIONS

This application claims the benefit under 35 USC 119(e) of prior U.S. application No. 60/532,887 filed Dec. 30, 2003 and 60/544,325 filed Feb. 17, 2004, the contents of which are herein incorporated by reference.

FIELD OF THE INVENTION

The present invention relates to the field of semi-conductor nanocrystal technology, and in particular to the synthesis of semi-conductor nanocrystals. These nanocrystals can be used for various applications, such as labelling and sensing.

BACKGROUND OF THE INVENTION

Semiconductor nanocrystals are nanoparticles composed of an inorganic, crystalline semiconductive material and have unique photophysical, photochemical and nonlinear optical properties arising from quantum size effects, and have therefore attracted a great deal of attention for their potential applicability in a variety of contexts, e.g., as detectable labels in biological applications, and as useful materials in the areas of photocatalysis, charge transfer devices, and analytical chemistry. U.S. Pat. No. 6,821,337, the contents of which are incorporated herein by reference, discloses methods for making such nanocrystals. However, it has generally been found difficult to control the quality of such nanocrystals.

CdE, where E=S, Se, Te, are currently the most promising materials among the II-VI and III-V semiconductor nanocrystals suitable for applications based on their size-dependent emission. For example, CdSe nanocrystals emit from blue to red, depending on their size. Usually, photoluminescent properties are described by four parameters: emission wavelength, full width at half maximum (FWHM), intensity, and stability. The wavelength, which is directly related to the emission colour, is mainly determined by the nanocrystal size; furthermore, the FWHM depends strongly on size polydispersity. Because of the large surface-to-volume ratio, the photoluminescent efficiency, that is, intensity and stability, is primarily related to surface properties. Therefore, to target final performance, the focus should be on the synthesis of nanocrystals of an optimum size with a small size distribution as well as with few surface defects. The term, quantum dots, is used when the nanocrystals are nearly spherical in shape.

The first synthesis of CdE nanocrystals yielding a high quality product regarding the control of size, size distribution and crystallinity, was reported in 1993 (*J. Am. Chem. Soc.* 1993, 115, 8706-8715) using an organometallic approach. In this approach dimethylcadmium, $Cd(CH_3)_2$, is selected as the Cd source. Nucleation occurs at a high temperature (340-360° C.) in a coordinating solvent system consisting of a mixture of tri-n-octylphosphine (TOP) and tri-n-octylphosphine oxide (TOPO). $Cd(CH_3)_2$ is toxic, pyrophoric, expensive, unstable at room temperature in air, and explosive due to the release of gas during synthesis. This organometallic approach requires extremely restrictive synthetic equipment and conditions.

These problems can be partially overcome partially by using another synthetic route with an alternative Cd source developed in 2001 (*J. Am. Chem. Soc.* 2001, 123, 183-184), and described in the corresponding patent application entitled "Synthesis of Colloidal Nanocrystals" (PCT/US01/31239, or WO 02/29140 A1) filed on Oct. 04, 2001, the contents of which are herein incorporated by reference. In this approach, CdO and some Cd salts are used as the Cd precursors instead of $Cd(CH_3)_2$. It is claimed that the quality (i.e. the control of size(/shape) and distribution) of the CdSe dots prepared is comparable to those of the best reported in literature even without size selection. However, this method requires the use tri-n-octylphospine oxide and an acid.

Compared to $Cd(CH_3)_2$, CdO is less toxic, non-pyrophoric, less expensive, and safer to handle. The approaches using non-organometallic sources (such as CdO) are likely to become popular for the mainstream researchers as the more straightforward synthetic protocols that do not require the advanced degree of synthetic expertise; furthermore, these approaches provide the basis of an industrial-scale formulation for high-quality nanocrystals.

According to this approach an elemental chalcogen source in TOP (such as TOPSe) is added into a hot solution of CdO and tetradecylphosphonic acid (TDPA, excess) in TOPO at a temperature 250-360° C. It is claimed that a ligand (such as TDPA) with the molar ratio of the ligand to CdO larger than 1, had to be used. The reason given for this is the formation of a metal complex that is soluble in the coordinating solvent TOPO.

It is clearly indicated in the published patent application on page 3, lines 28-29, that "If CdO or $CdCO_3$ is the precursor, amines and TOPO cannot be used as the ligands and can only be used as coordinating solvents." Furthermore, "the presence of stearic acid was proven to be helpful for the formation of large-sized CdSe nanocrystals, which emit in the organe-red window." (*J. Am. Chem. Soc.* 2002, 124, 2049-2055) Thus, the synthetic media in this approach involved five components, including two amines and one acid. (*J. Am. Chem. Soc.* 2002, 124, 2049-2055)

The JACS 2002 report referred to above discusses the evolution of the photoluminescent intensity of CdSe quantum dots produced via the non-organometallic approach using a complex of CdO and excess stearic acid. A corresponding patent application entitled "Colloidal Nanocrystals with high Photoluminescence Quantum Yields and Methods of Preparing the Same" (PCT/US02/24214 or WO 03/012006 A1) was filed on Jul. 30, 2002 and published on Feb. 13, 2003. The study shows that the photoluminescent intensity (quantum yield, QY) increases monotonically to a maximum value and then decreases during the growth of the dots from a single synthetic batch.

The maximum was termed a photoluminescent "bright point". The photoluminescent intensity, represented by the quantum yield (QY), was based on the use of traditional dyes. However, it has been acknowledged that the demonstration of PL intensity by the QY is problematic, primarily because of the significant difference in QY values when different dyes are used. In addition, such a fundamental examination (JACS 2002) was based on materials synthesized from a five-component reaction medium involving the acid, two amines, TBP (tri-butylphosphine), and TOPO.

Photoluminescent properties are generally characterized by four parameters: emission wavelength (colour), full width at half maximum (FWHM) (colour purity), intensity (brightness), and stability. In order to improve the synthetic recipes and to develop optimal synthetic schemes for nanocrystals with desirable photoluminescent properties, it is necessary to note carefully what is known regarding the synthetic parameters affecting photoluminescent intensity. However, regarding the synthesis of "high quality" nanocrystals, present attention has been focused on controlling the size and size distribution. The term "high-quality" has not to date focused on the "long-term stability" and "sensitivity" of nanocrystals in various environments, such as polar and non-polar environments, both of which are important parameters relating to the quality of the nanocrystals.

After the first two reports (JACS 1993 and JACS 2001) on the synthesis of "high" quality" CdSe nanocrystals using $Cd(Me)_2$ or CdO as the Cd precursors in, there is only one patent which was filed and opened but has not been granted, dealing with the synthesis of CdSe nanocrystals using CdO as the Cd precursor. The above PCT application claims that a ligand, in the form of an acid, is required.

SUMMARY OF THE INVENTION

According to the present invention there is provided a method of making nanocrystals comprising preparing at least one chalocogen source consisting essentially of a complex of a chalcogen and a ligand solvent in a solution thereof; preparing at least one cation source consisting essentially of a complex of a non-organometallic metal precursor compound and a ligand solvent in a solution thereof; and subsequently adding said at least one chalcogen source to at least one said metal precursor to grow said nanocrystals. The method is carried out in the absence of added acid. The applicants have found expectedly that contrary to the teachings of the prior art, superior results can be obtained when the complex is dissolved in the ligand solvent, which is typically a phosphine-based solvent, such as TOP or TOPO, without an added acid. The resulting nanocrystals have superior properties compared to the prior art, particularly in terms of UV stability. The metal precursor is preferably a metal oxide or metal salts. The metals include most transition metals (i.e., Cd, Zn, Hg, Cu, Ag, Ni, Co, Fe, Mn, Ti, Zr, etc.), group III metals (i.e., Al, Ga, In) and group VI metals (i.e., Sn, Pb), as described in F. A. Cotton et al. [Advanced Inorganic Chemistry, 6th Edition, (1999)].

A ligand is an agent that can bind to the precursor to form a complex that is soluble. In accordance with principles of the invention the thus formed complex is dissolved in the same solvent as is used to form the complex. The solubility of the complex should be sufficient for the synthesis of the nanocrystals using the reaction conditions described herein.

Using a metal oxide or metal salt precursor, such as CdO or Cd salts, nanocrystals, such as CdSe, can be synthesized with only two-component traditional coordination surface ligands and one-component surface ligands The solution is preferably maintained at a temperature of 200-300° C., and the temperature may be lowered, preferably in the range 170-300° C., to grow the crystals. The method of the invention is carried out in the absence of an acid contrary to the method described in WO 02/29140. The inventors have unexpectedly found that contrary to the express teachings of this patent, it is possible to form complexes directly in the ligand solvent without the use of an acid, and particularly in the case of phosphine-based solvents, such as TOP and TOPO.

The invention employs both a one-component approach or a two-component approach. In the one-component approach the ligands are the same, for example, TOP; in the two-component approach, the ligands are different, for example, TOP and TOPO(preferably 99% purity). In both cases the TOP and TOPO solvents serve as ligand solvents.

The invention provides a solvent system consisting of fewer components for synthesizing "high-quality" nanocrystals with safe Cd precursors, such as CdO.

The novel synthetic approaches adopted in the present invention do not involve the use of acids, and thus are completely different from those reported and used elsewhere at present. The synthetic route is shorter and the costs are lower. In addition, with the synthetic scheme proposed here, it is easy to prepare "high quality" CdSe nanoparticles of various sizes, especially "large" ones with yellow to red emission colours (580 nm-650 nm) wavelength.

It is also possible to make two-component nanocrystals having a core and shell of different materials. For example, the nanocrystals may consist of a CdTe core surrounded by a CdSe shell. To make such nanocrystals, a first chalcogen source, such as TOP/Te, is added to the hot solution of, for example, CdO, and the temperature reduced to grow the CdTe core. A second chalcogen source, such as TOP/Se, as then added to the hot solution to form the shell, in this case CdSe. Before the second growth additional CdO can be added, but if sufficient CdO is present initially this step may not be necessary. The resulting nanocrystals with a CdTe core and CdSe shell are useful, for example, in solar cells because they provide separation of holes and electrons in the different layers. Three-layered structures can be made by adding a third chalcogen source.

In an alternative method it is possible to make nanocrystals consisting of an alloy, such as CdZnSe. In this case the hot solution may contain a mixture of CdO and zinc stearate, for example. The TOP/Se is added to the solution and the resulting nanocrystals are of CdZnSe. In that case more than one cation source is employed.

BRIEF DESCRIPTION OF THE DRAWINGS

The invention will now be described in more detail, by way of example only with reference to the accompanying drawings, in which.

DETAILED DESCRIPTION OF THE PREFERRED EMBODIMENTS

Figure 1:
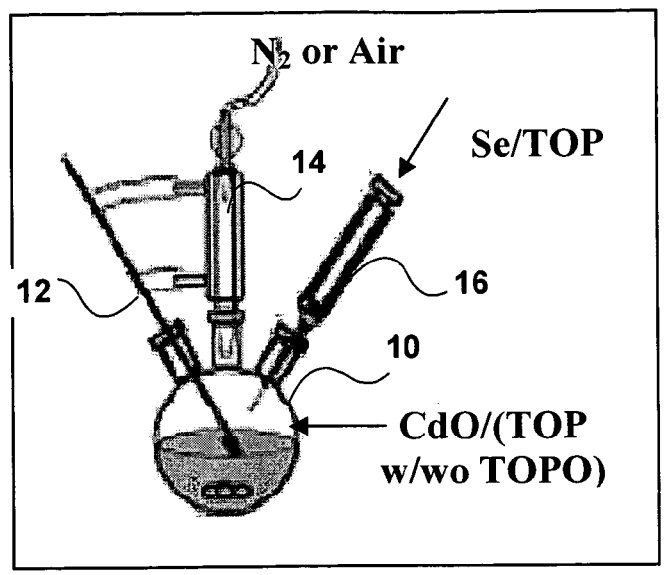
FIG. 1 is an illustration of an experimental setup for making nanacrystals.

A first synthetic approach in accordance with the principles of the invention involves the addition of a complex of a chalcogen source (such as TOPSe) in a ligand solvent, such as TOP, into a hot solution of CdO in TOP (at a temperature 200-300° C.) and followed by growth at a lower temperature (170-300° C.). This approach is termed the one-component approach and the resulting nanocrystals are termed as single-(surface) ligand nanocrystals or TOP-nanocrystals. The nucleation temperature, CdO concentration, and Cd to Se ratio are used to control the resulting nanocrystal qualities.

The second synthetic approach involves the addition of a chalcogen source (such as TOPSe) in TOP into a hot solution of CdO in TOPO (preferably 99% purity) (at a temperature 200-300° C.) and afterwards growth at a temperature (170-300° C.). This approach is termed as two-component approach and the resulting nanocrystals are termed as two-(surface) ligand nanocrystals or TOP/TOPO-nanocrystals. The composition of the synthetic media (namely the weight ratio of TOP to TOPO), in addition to the nucleation temperature, CdO concentration, and Cd to Se ratio, is used to control the growth kinetics as well as the resulting "quality" of the nanocrystals.

The evolution of the PL properties of the nanocrystals during the synthesis as well as during post treatment can monitored easily and compared without the use of dyes. Aliquots of the reaction solution are removed at different intervals (30 second to 2 hours) and are kept in vials. Afterwards, the same amount (1) of each sample is dispersed into the same amount (2) of solvent, and the solutions are used for subsequent UV and PL study. A "bright point" or a "bright platform" can be observed and controlled mainly through the synthetic media. Furthermore, the quantum yields for various nanocrystals are obtained with only one dye, but these are based on the intensity data from the PL spectra obtained using the present technique. Regarding nanocrystals from one simple synthetic scheme, the UV and PL properties are monitored and compared in both non-polar hexane (Hex) and polar THF. Interestingly, the intensity, emission peak wavelength, FWHM, and stability are sensitive to their dispersed environments, in addition to the synthetic history. The change in the PL intensity of the nanocrystal on going from hex to THF, representing the sensitivity, is defined as the sensitivity index (SI).

After synthesis, the resulting nanocrystals are stored for days either in solutions (such as dispersed in Hex, Toluene, CHCl$_3$ with or without water, THF with or without added water, DMF, and Dioxane), or in their solid state. The changes of the PL properties are monitored; interestingly, the intensity, emission peak wavelength, FWHM, and stability are sensitive to their storage history. Particularly, an increase or a decrease of the PL intensity could be controlled through the synthetic history and/or the storage history, as well as through additives. Regarding various applications such as labeling and sensing, various considerations should be applied, even with the sensitivity of the nanocrystals to their environments. For example less sensitive nanocrystals may be good for labeling, while more sensitive nanocrystals for environmental sensing.

With CdO as the Cd precursor, there is no acid (either organic nor inorganic) used in the synthesis. In addition, there is no TOPO used in the synthesis of one-ligand nanocrystals. It is generally accepted that at least two chemicals, termed either solvents or ligands, should be used to control the attraction and repulsion during synthesis, in order to obtain "high quality" nanocrystals (with control of size and size distribution). Thus, the present invention represents a starting point for the synthesis of "high quality" nanocrystals with only one component as their surface ligands. This strategy has general application for various nanocrystals from various synthetic media consisting of only a one-component chemical system.

"High quality" is considered with two additional parameters: long-term stability for nanocrystals in their dispersed environments and in their solid state, as well as sensitivity. For various applications such as labelling and sensing, less sensitive nanocrystals are thought to be good for labeling, while more sensitive nanocrystals are required for environmental sensing.

The experimental setup is shown in FIG. 1. The metal-containing non-organometallic compound is placed in the retort 10 in a ligand solution and heated to the desired temperature, typically in the range 200-300° C. The temperature is monitored with the aid of the thermometer 12. Nitrogen or air can be fed into the retort 10 through port 14. When the desired temperature has been obtained, the chalcogen solution is fed into the retort 10 through the port 16.

EXAMPLE 1

Figure 2:
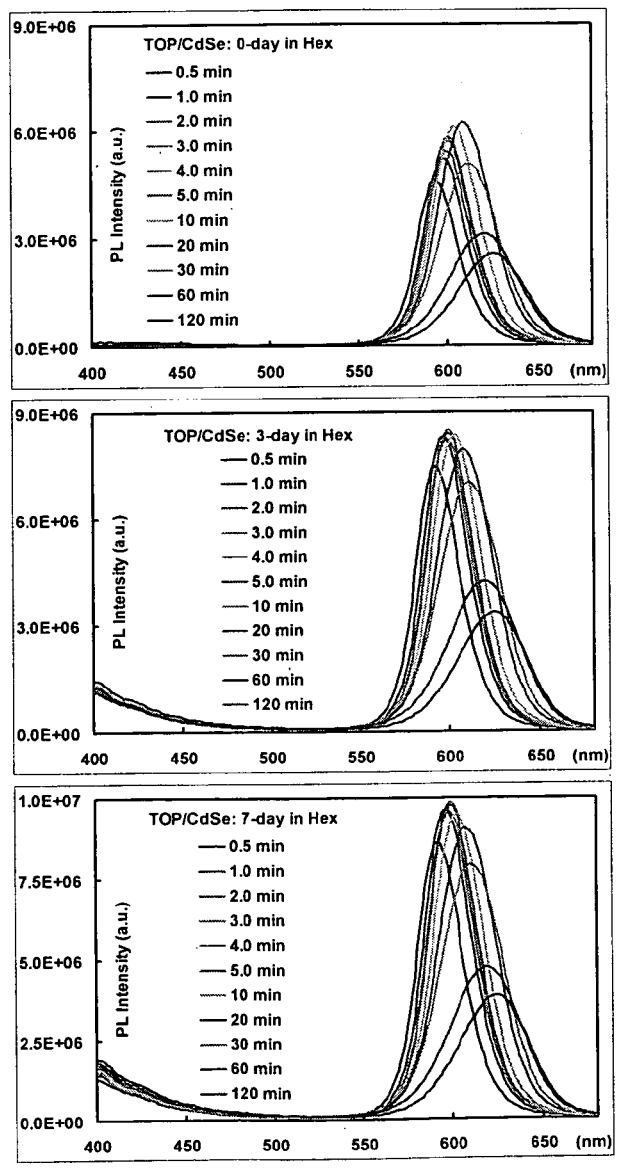
FIG. 2 shows the PL spectra of CdSe with one-component surface ligands (namely TOP), dispersed in Hex, after 0 day (up), 3 days (middle), and 7 days (down)

TOP-capped CdSe was made by adding a solution of TOP/Se to CdO in TOP under the following conditions:
CdO=12.8 mg (0.10 mmol)
Se=3.78 mg (0.05 mmol)
Cd/Se=2:1
TOP=1.58 g
CdO=63.3 mmol/kg
Nucleation temperature=300° C.
growth temperature =250 C FIG. 2 shows the PL spectra of CdSe with one-component surface ligands (namely TOP), dispersed in Hex, after 0 day (up), 3 days (middle), and 7 days (down).

Figure 3:
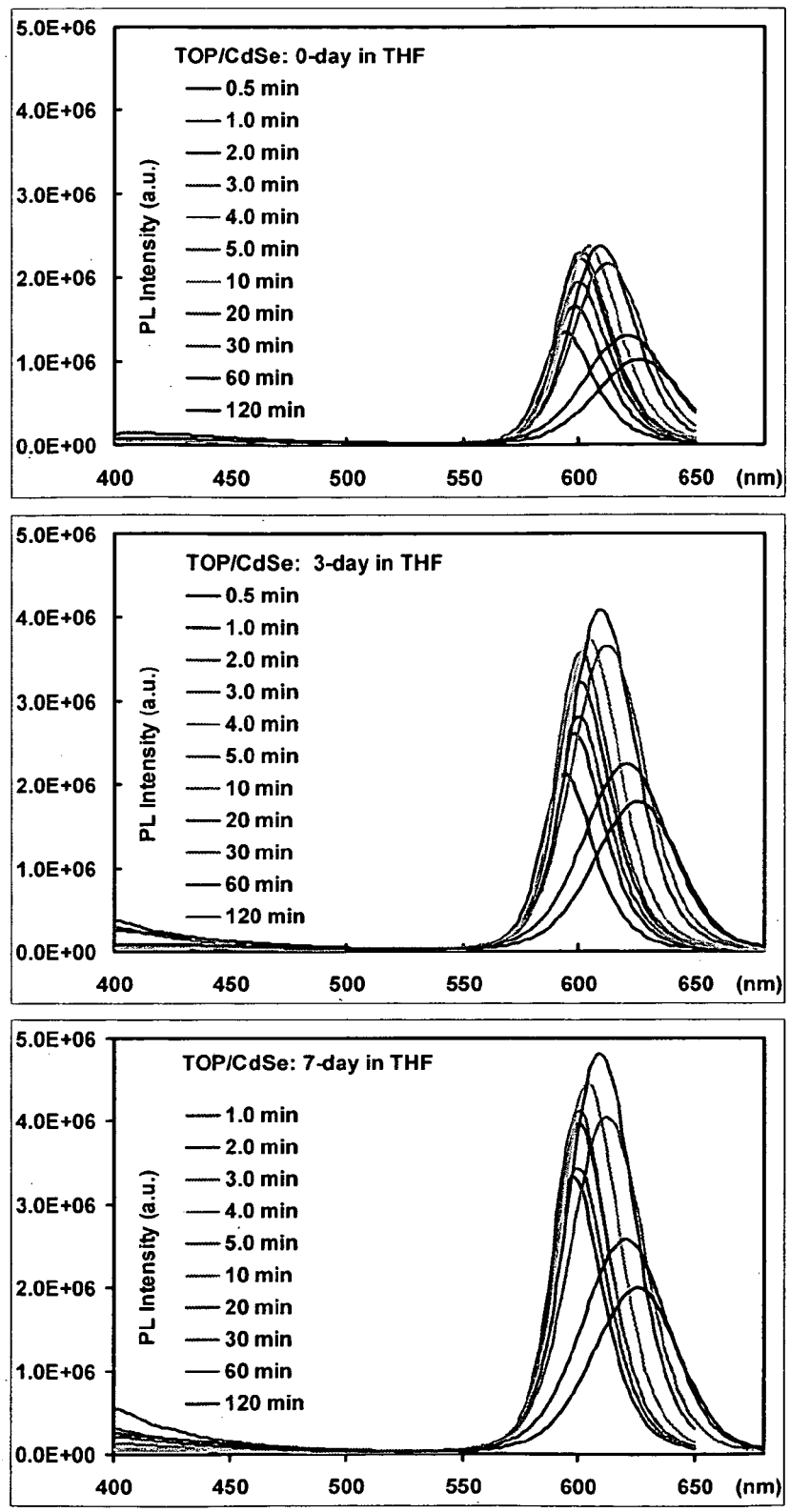
FIG. 3 show the PL spectra of as-synthesized CdSe with one-component surface ligands (namely TOP), dispersed in THF, after 0 day (up), 3 days (middle), and 7 days (down)

FIG. 3 show the PL spectra of as-synthesized CdSe with one-component surface ligands (namely TOP), dispersed in THF, after 0 day (up), 3 days (middle), and 7 days (down).

Figure 4:
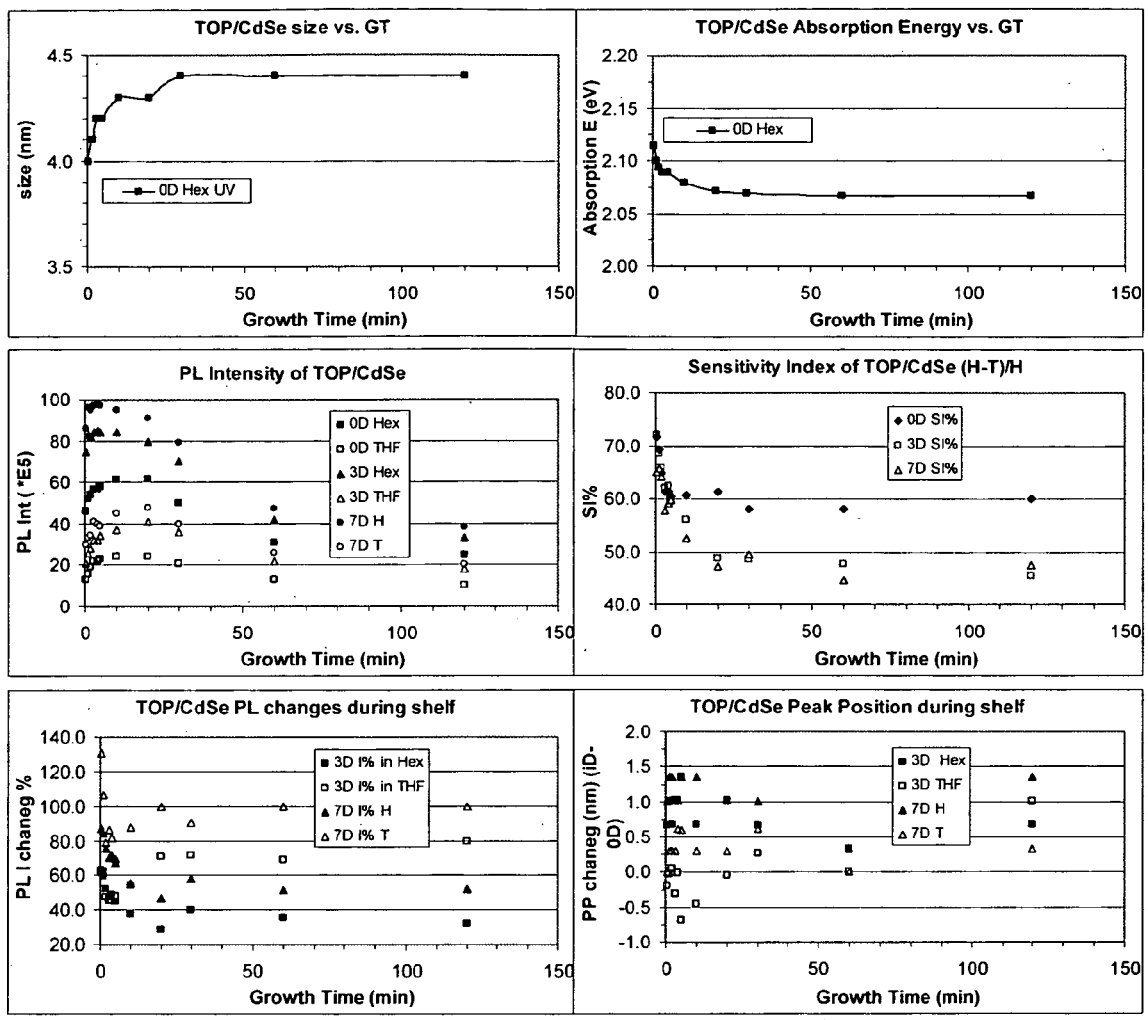
FIG. 4 is an analysis of the UV and PL characterization of the as-synthesized CdSe with one-component surface ligands, dispersed in Hex and THF.

FIG. 4 is an analysis of the UV and PL characterization of the as-synthesized CdSe with one-component surface ligands, dispersed in Hex and THF. The shelf time in Hex or THF is 3 days and 7 days.

Figure 5:
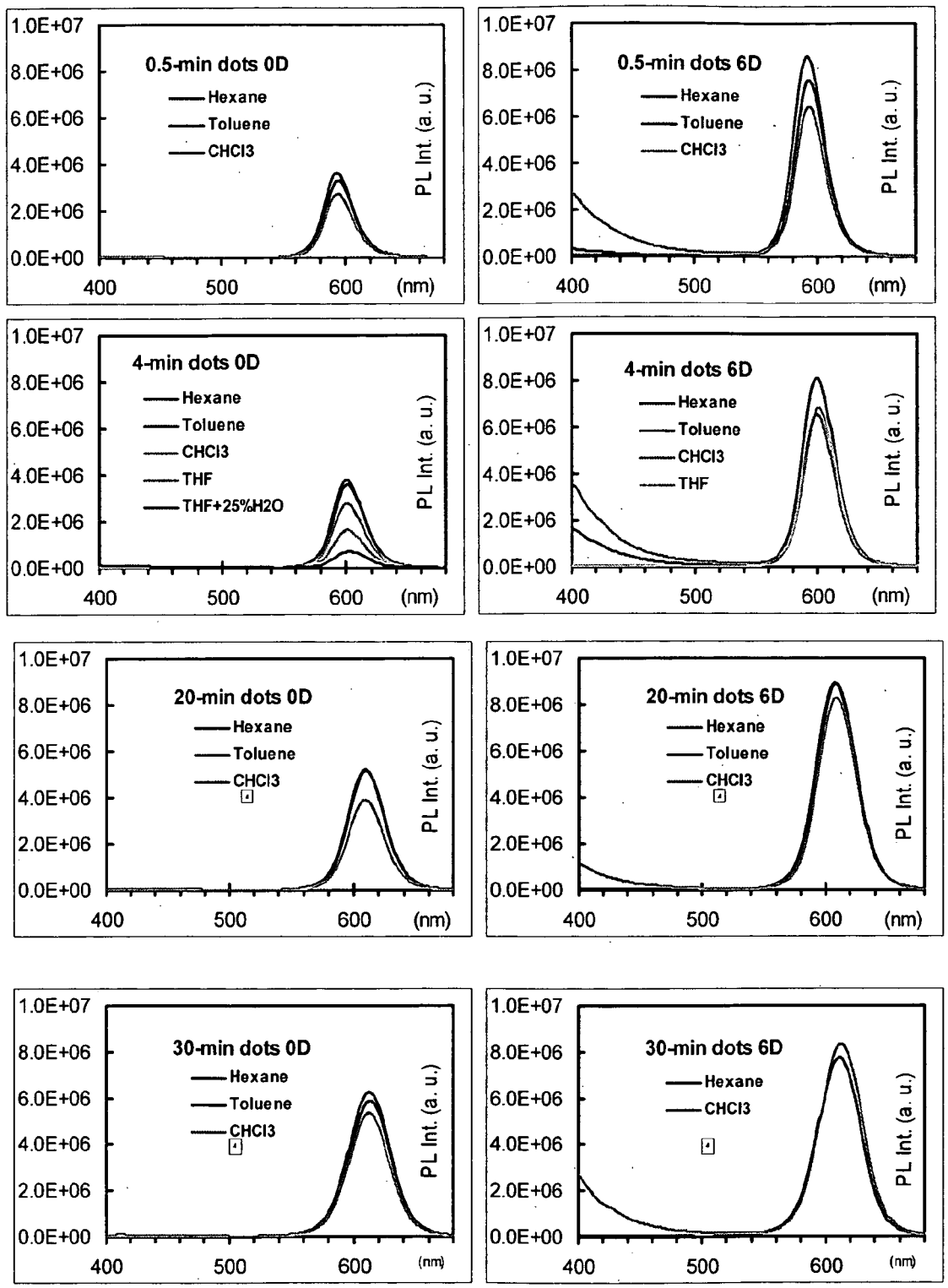
FIG. 5 shows the PL spectra of CdSe with one-component surface ligands (TOP) dispersed in various solvents, the nanocrystals were two-day old after synthesis but stored in solid state.

FIG. 5 shows the PL spectra of CdSe with one-component surface ligands (TOP) dispersed in various solvents, the nanocrystals were two-day old after synthesis but stored in solid state—(left) as-dispersed and (right) after 6-days.

Figure 6:
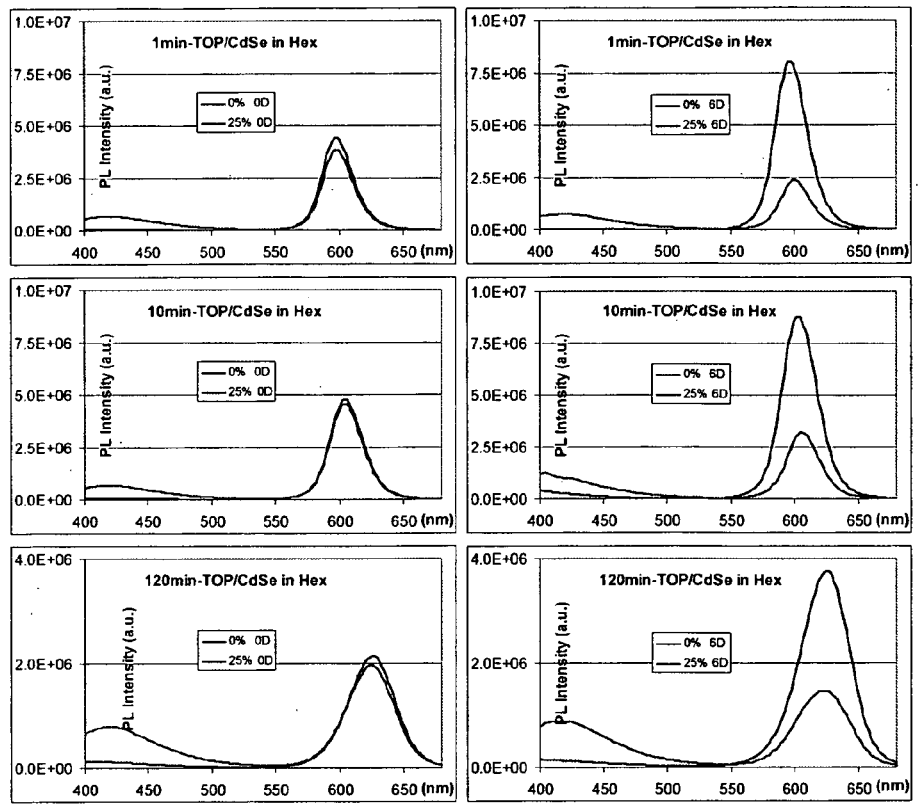
FIG. 6 shows the PL spectra of CdSe with one-component surface ligands (TOP) dispersed in Hex.

FIG. 6 shows the PL spectra of CdSe with one-component surface ligands (TOP) dispersed in Hex. This shows the effect the additive (TOP) has on the PL properties, (left) 0-day in dispersion and (right) after 6-days in dispersion. The dots were one-day old after synthesis but stored in solid state.

Figure 7:
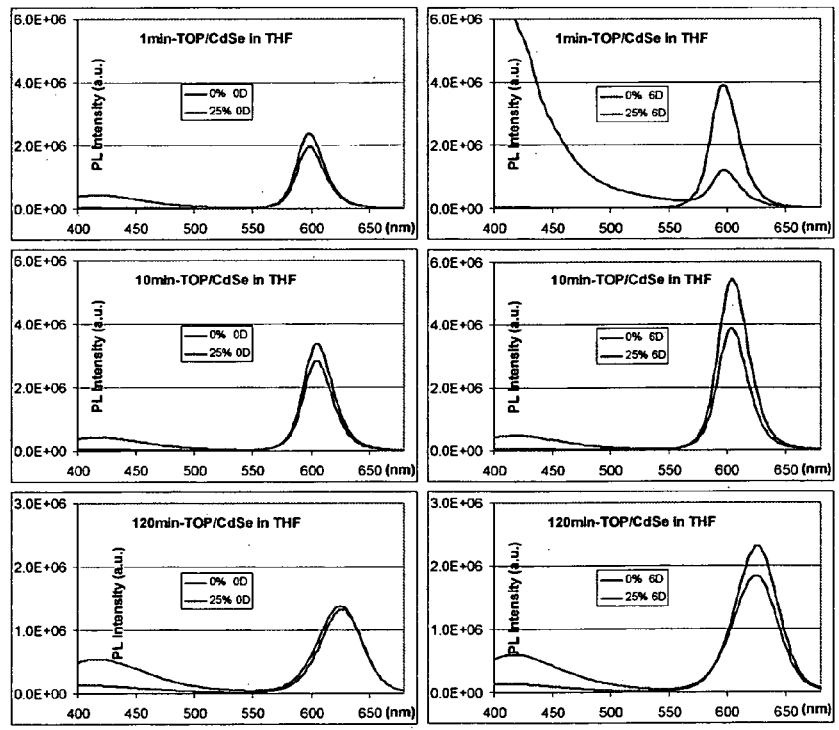
FIG. 7 shows the PL spectra of CdSe with one-component surface ligands (TOP) dispersed in THF.

FIG. 7 shows the PL spectra of CdSe with one-component surface ligands (TOP) dispersed in THF. This shows the effect the additive (TOP) has on the PL properties, (left) 0-day in dispersion and (right) after 6-days in dispersion. The dots were one-day old after synthesis but stored in solid state.

EXAMPLE 2

CdSe was made by adding a solution of TOP/Se to Cd(Ac)$_2$ in TOP under the following conditions:
Cd(Ac)$_2$=23.08 mg (0.10 mmol)
Se=3.95 mg (0.05 mmol)
Cd/Se=2:1
TOP=2.814 g;
Cd(Ac)$_2$=35.7 mmol/kg
Nucleation temperature=300° C.
growth temperature=250° C.

Figure 8:
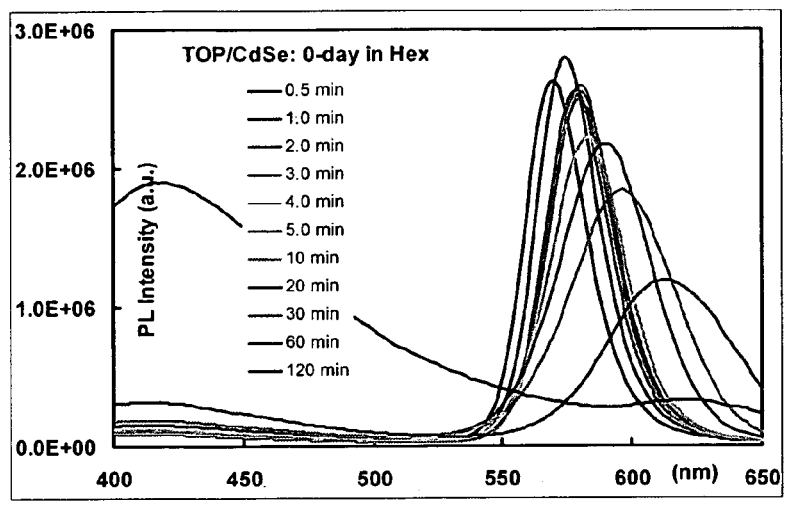
FIG. 8 shows the PL spectra of the synthesized CdSe with one-component surface ligands (namely TOP), dispersed in Hex (up) and THF (down)
Figure 8:
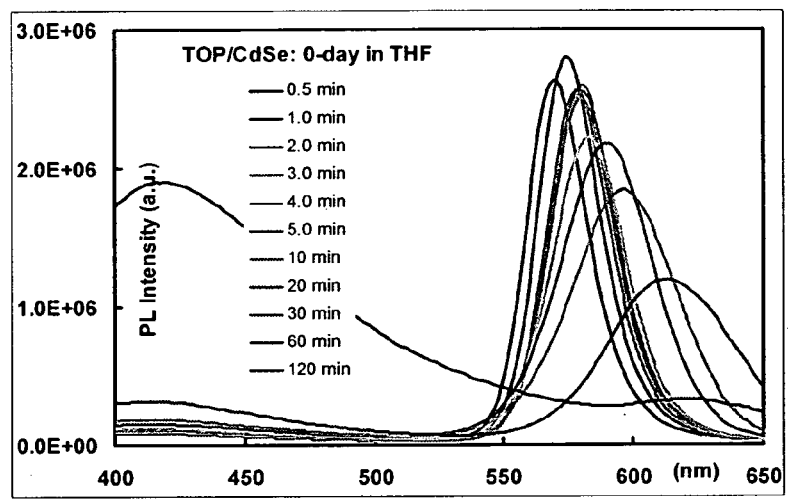

FIG. 8 shows the PL spectra of the synthesized CdSe with one-component surface ligands (namely TOP), dispersed in Hex (up) and THF (down).

EXAMPLE 3

TOP-capped CdTe as made under the following conditions:
CdO=12.85 mg (0.10 mmol)
Te=5.70 mg (0.05 mmol)
Cd/Te=2:1
TOP=1.56 g
CdO=64 mmol/kg
Nucleation temperature=300° C.
growth temperature=250° C.

Figure 9:
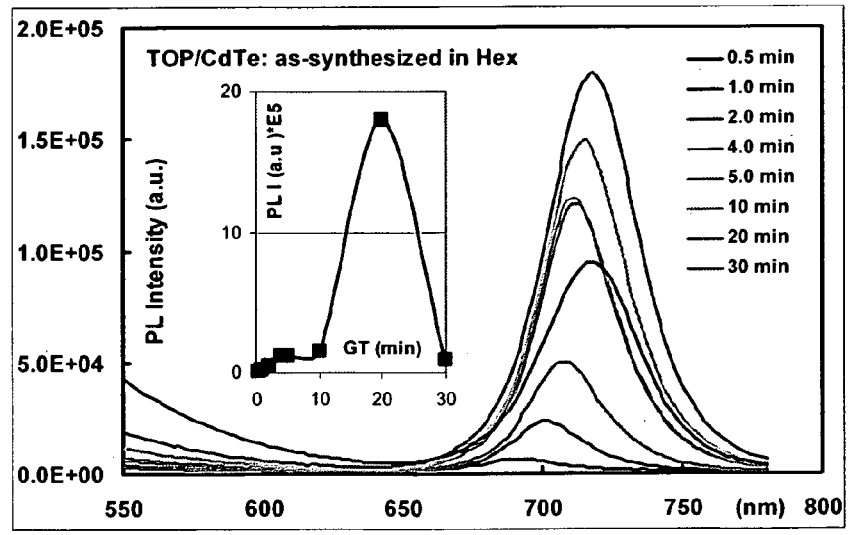
FIG. 9 shows the PL spectra of as-synthesized CdTe with one-component surface ligands (namely TOP), dispersed in Hex.

FIG. 9 shows the PL spectra of as-synthesized CdTe with one-component surface ligands (namely TOP), dispersed in Hex. The PL intensity vs. growth time is plotted and inserted.

EXAMPLE 4

TOP/TOPO-capped CdSe was made using a two component system under the following conditions:
CdO=38.22 mg (0.30 mmol)
Se=12.13 mg (0.15 mmol)
Cd/Se=2:1
TOP=1.75 g
TOPO=1.82 g (total=3.57 g)
(TOP to TOPO=1 to 1 weight ratio)
CdO=84 mmol/kg
Nucleation temperature=270° C.
growth temperature=220° C.

Figure 10:
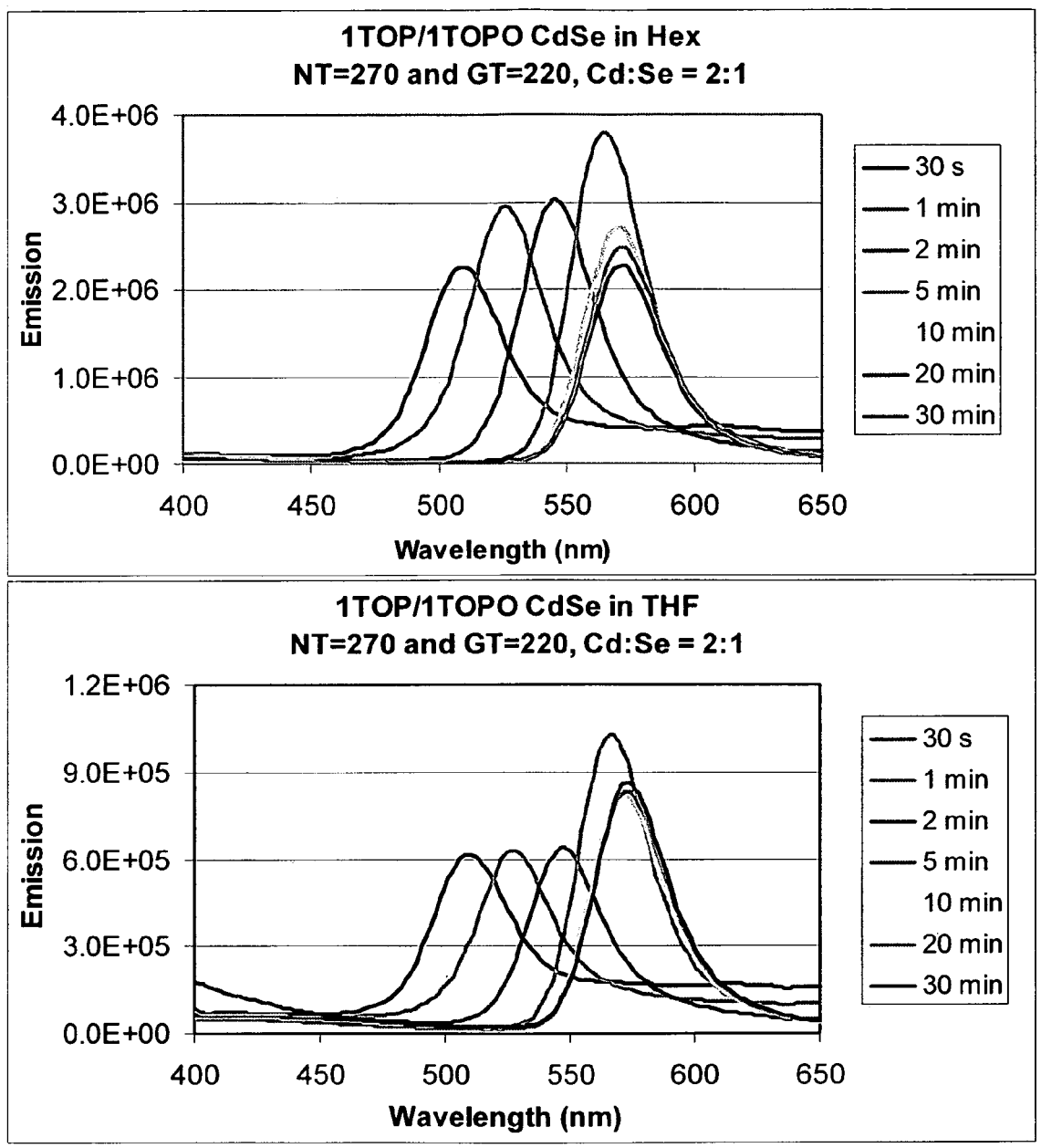
FIG. 10 shows the PL spectra of the as-synthesized CdSe with two-component surface ligands, dispersed in Hex (up) and THF (down)

FIG. 10 shows the PL spectra of the as-synthesized CdSe with two-component surface ligands, dispersed in Hex (up) and THF (down).

Figure 11:
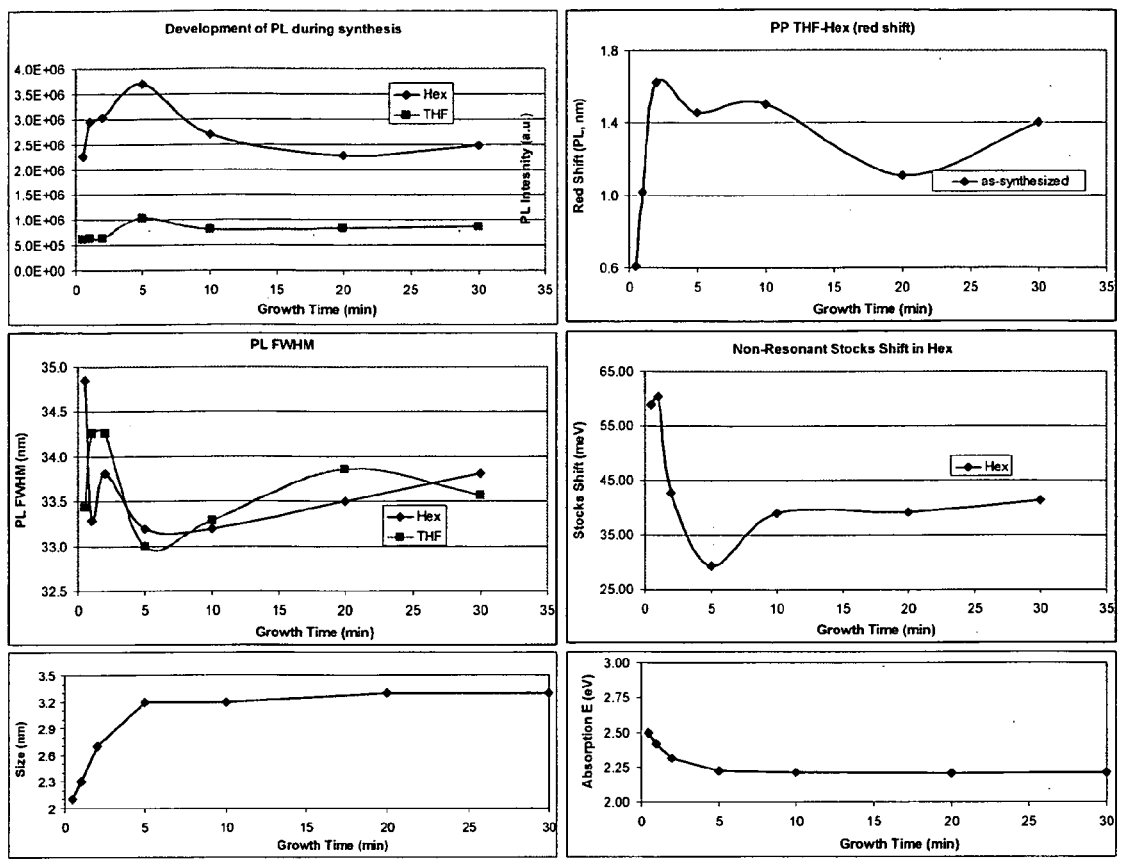
FIG. 11 shows an analysis of the UV and PL characterization of as-synthesized CdSe with two-component surface ligands, dispersed in Hex and THF.

FIG. 11 shows an analysis of the UV and PL characterization of as-synthesized CdSe with two-component surface ligands, dispersed in Hex and THF.

Figure 12:
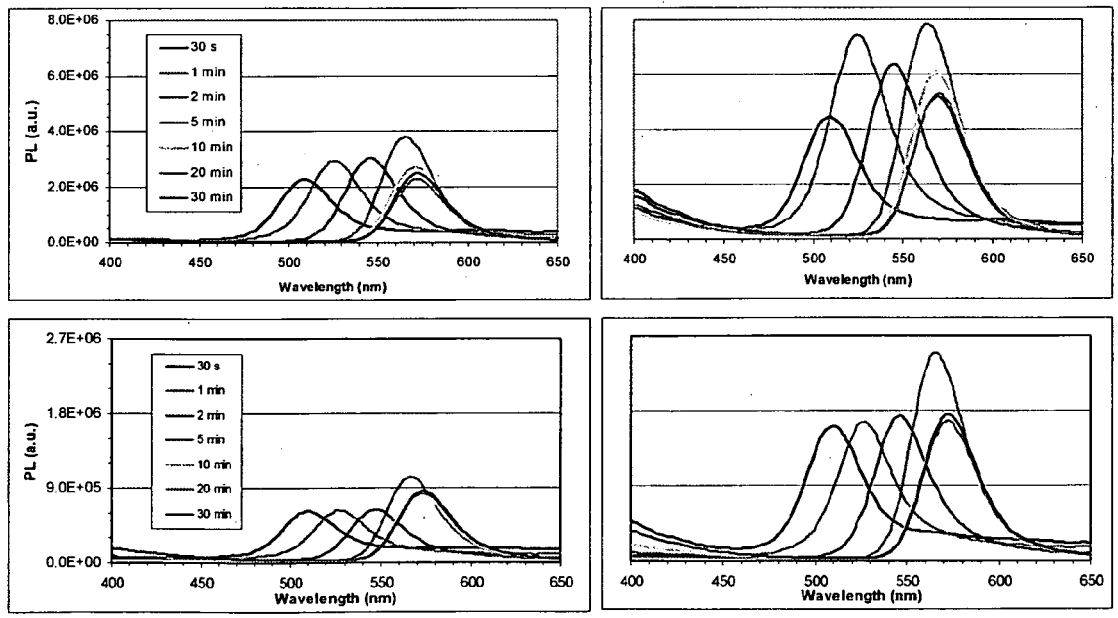
FIG. 12 shows the PL spectra of CdSe with two-component surface ligands, dispersed in Hex (up) and THF (down), as-synthesized (left) and after 3-day storage in dispersions (right)

FIG. 12 shows the PL spectra of CdSe with two-component surface ligands, dispersed in Hex (up) and THF (down), as-synthesized (left) and after 3-day storage in dispersions (right).

Figure 13:
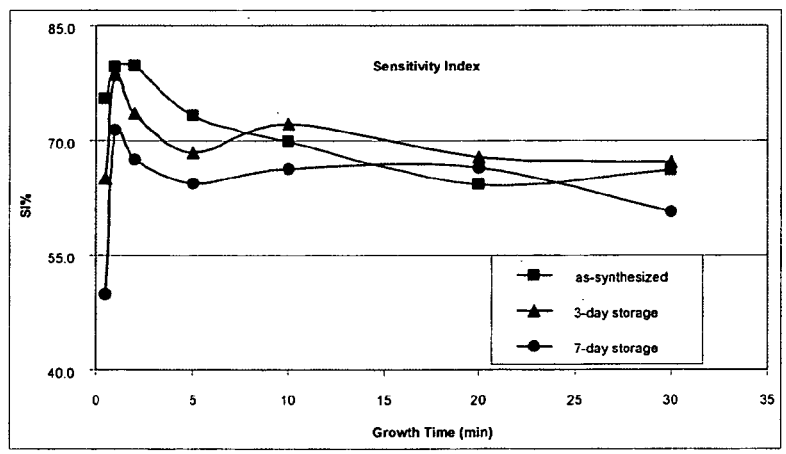
FIG. 13 shows the Sensitivity Index ($SI=(I_{hex}-I_{thf})/I_{hex}$) of the TOP/TOPO passivated CdSe.

FIG. 13 shows the Sensitivity Index (SI=$(I_{hex}-I_{thf})/I_{hex}$) of the TOP/TOPO passivated CdSe.

Figure 14:
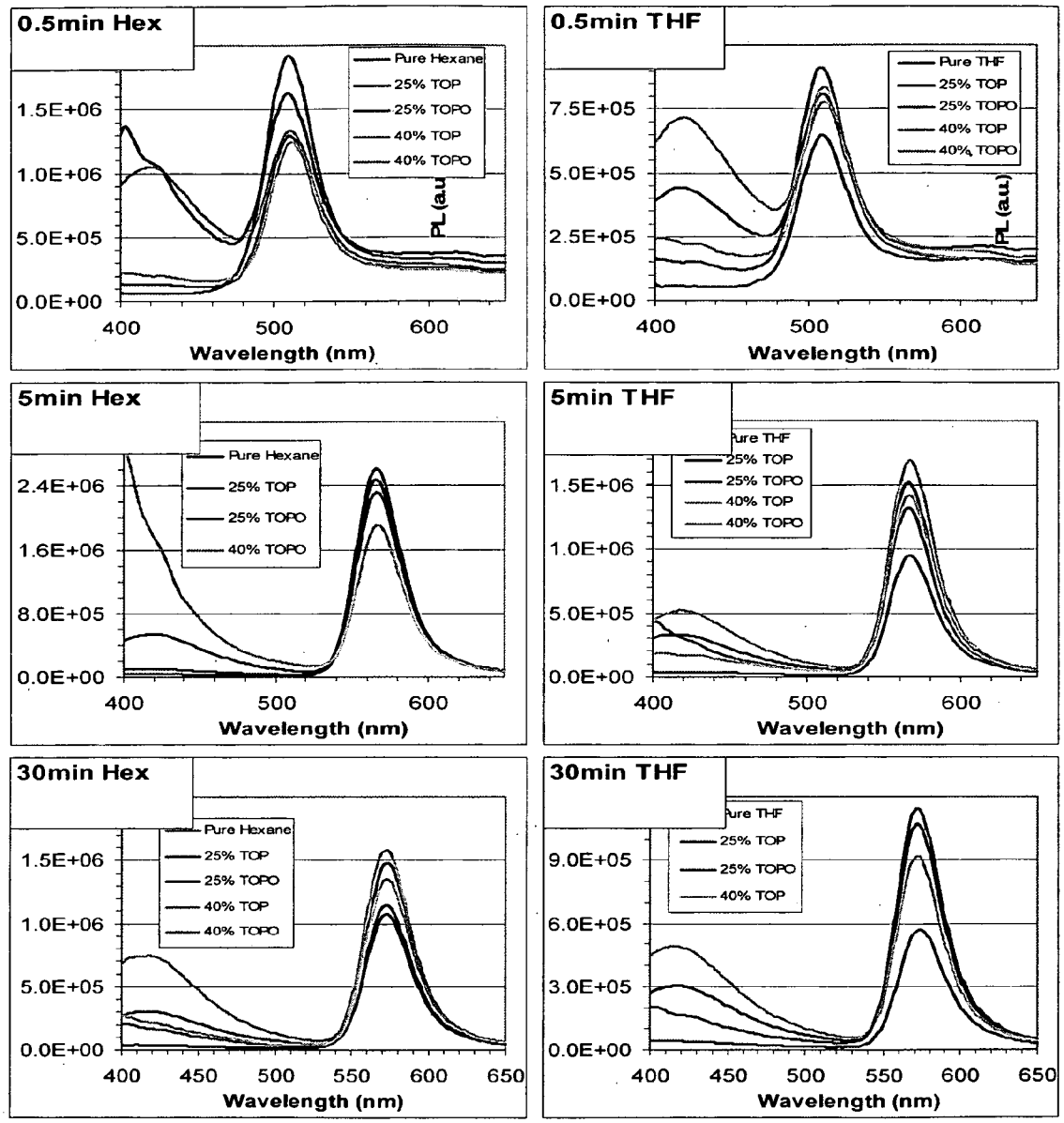
FIG. 14 shows the PL spectra of CdSe with two-component surface ligands, dispersed in Hex (left) and THF (right)

FIG. 14 shows the PL spectra of CdSe with two-component surface ligands, dispersed in Hex (left) and THF (right), an in particular the additive effects on PL properties.

Figure 15:
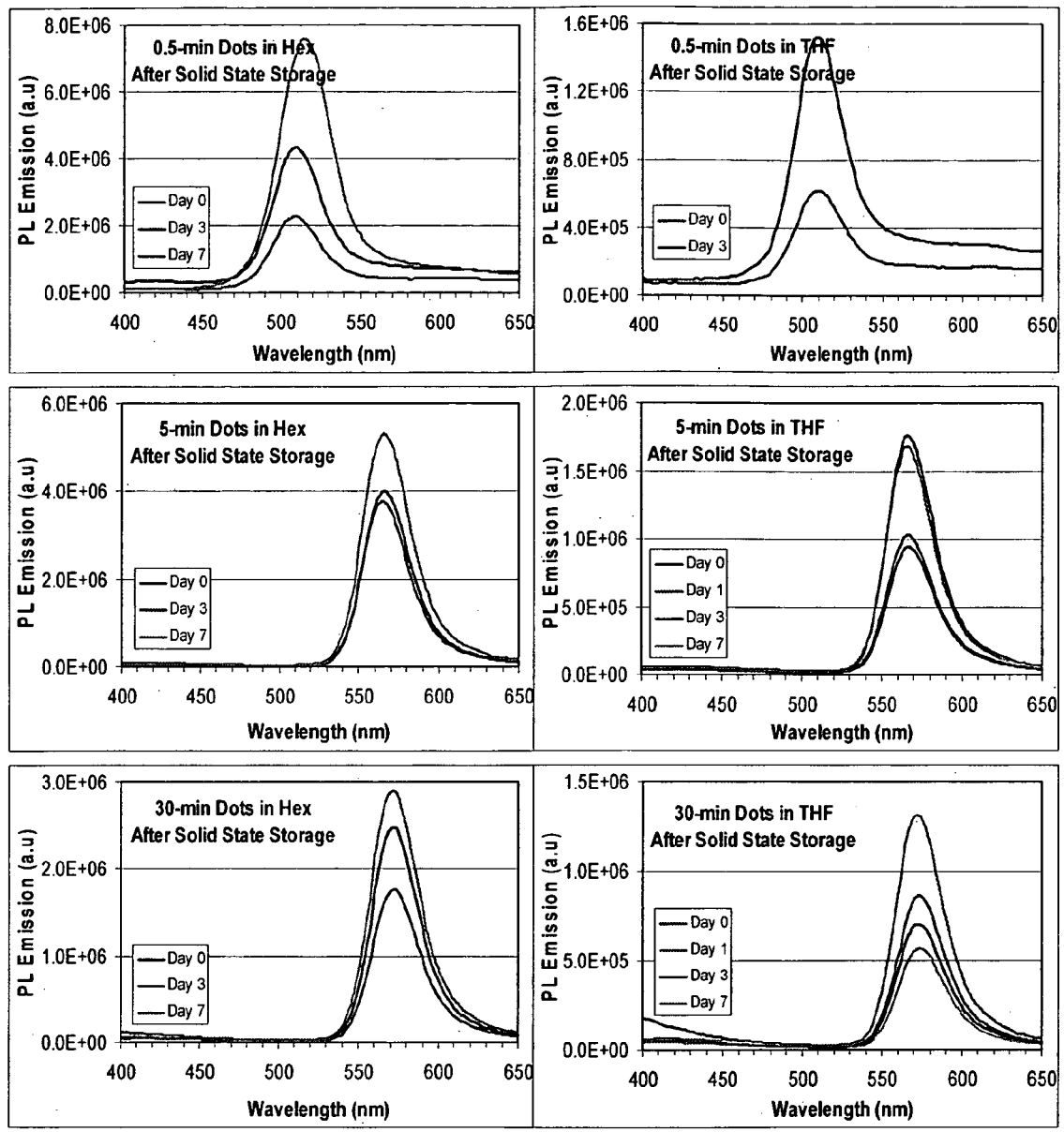
FIG. 15 shows the PL spectra of CdSe with two-component surface ligands, dispersed in Hex (left) and THF (right)

FIG. 15 shows the PL spectra of CdSe with two-component surface ligands, as-synthesized and after storage in solid state, dispersed in Hex (left) and THF (right).

EXAMPLE 5

2TOP/8TOPO-capped CdSe was made using a two-component system under the following conditions:
CdO=38.54 mg (0.30 mmol)
Se=12.06 mg (0.15 mmol)
Cd/Se=2:1
TOP=0.74 g and TOPO=2.84 g (total=3.58 g)
(TOP to TOPO=2 to 8 weight ratio)
CdO=84 mmol/kg
Nucleation temperature=270° C.
growth temperature=220° C.

Figure 16:
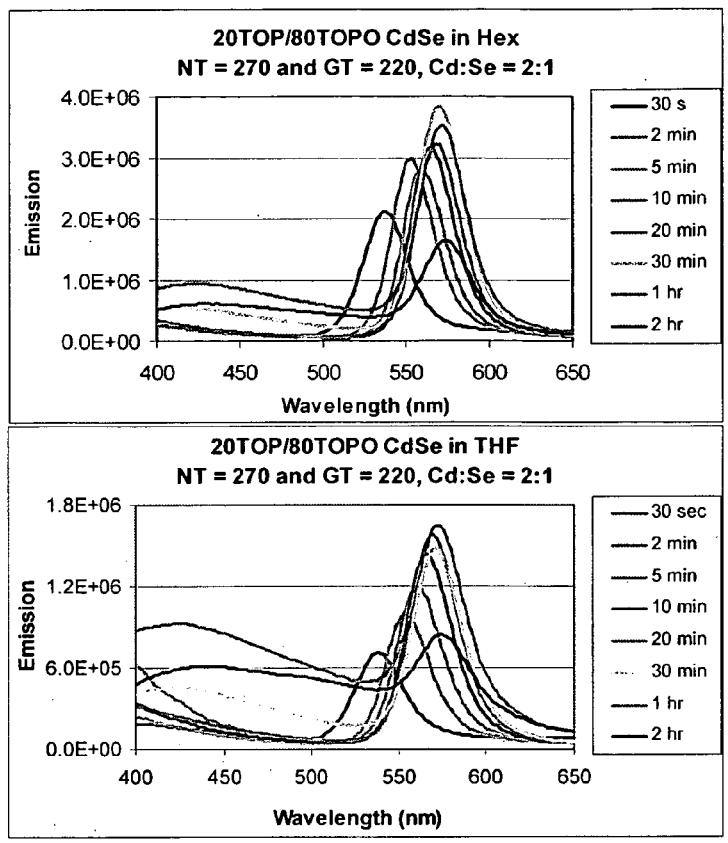
FIG. 16 shows the PL spectra of as-synthesized CdSe with two-component surface ligands dispersed in Hex (up) and THF (down)

FIG. 16 shows the PL spectra of as-synthesized CdSe with two-component surface ligands dispersed in Hex (up) and THF (down).

EXAMPLE 6

2TOP/8TOPO-capped CDSe was made using a two-component system under the following conditions:
CdO=12.37 mg (0.10 mmol)
Se=39.50 mg (0.50 mmol)
Cd/Se=1:5
TOP=0.24 g and TOPO=0.95 g (total=1.19 g) (TOP to TOPO=2 to 8 weight ratio)
CdO=84 mmol/kg
Nucleation temperature=270° C.
growth temperature=220° C.

Figure 17:
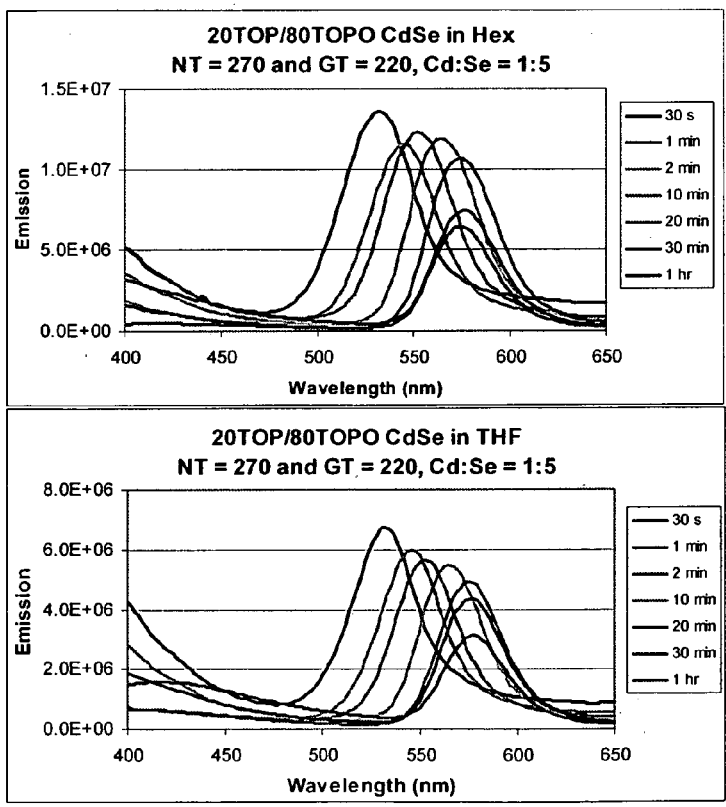
FIG. 17 shows the PL spectra of as-synthesized CdSe with two-component surface ligands dispersed in Hex (up) and THF (down)

FIG. 17 shows the PL spectra of as-synthesized CdSe with two-component surface ligands dispersed in Hex (up) and THF (down). No bright point is present.

EXAMPLE 7

2TOP/8TOPO-capped CdSe was made using a two-component system under the following conditions:
CdO=12.94 mg (0.10 mmol)
Se=3.94 mg (0.05 mmol)
Cd/Se=2:1
TOP=0.25 g and TOPO=0.94 g (total=1.19 g) (TOP to TOPO=2 to 8 weight ratio)
CdO=84 mmol/kg
Nucleation temperature=300° C.
growth temperature=200° C.

Figure 18:
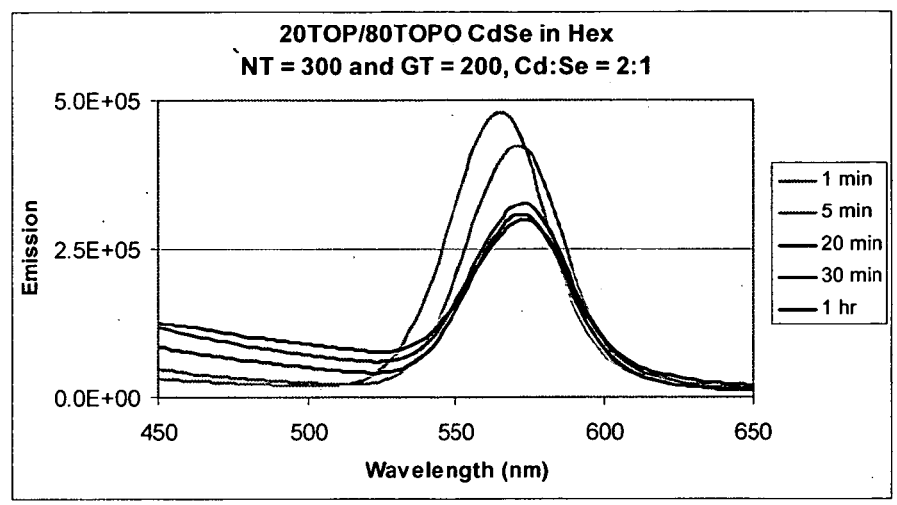
FIG. 18 shows the PL spectra of the as-synthesized CdSe with two-component surface ligands dispersed in Hex.
Figure 18:
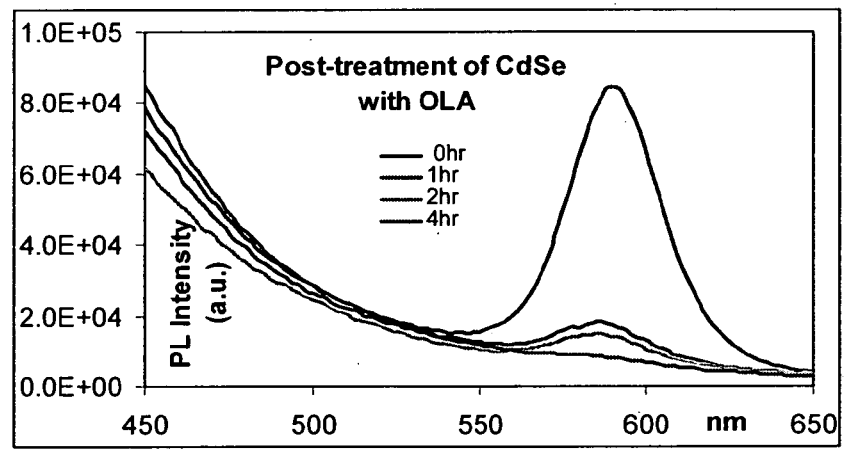

FIG. 18 shows the PL spectra of the as-synthesized CdSe with two-component surface ligands dispersed in Hex made in accordance with example 7.

Figure 19:
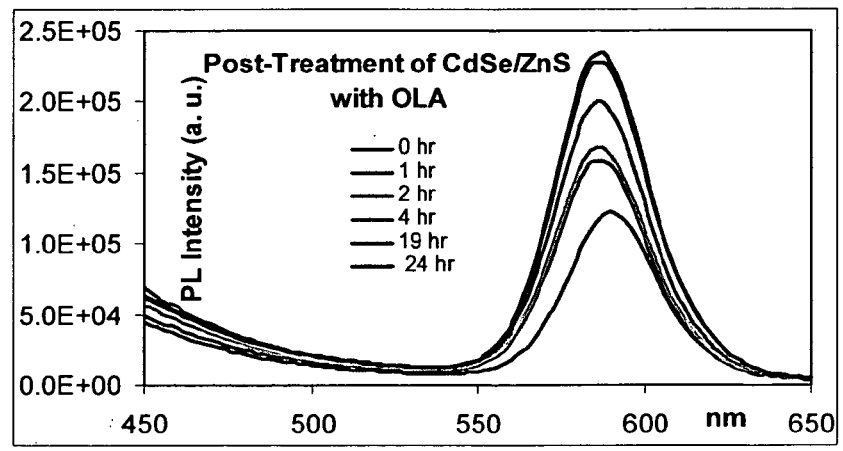
FIG. 19 shows the change of the PL properties during post-treatment on CdSe (up) and CdSe/ZnS (down) nanocrystals.

The change in the PL properties during post-treatment on CdSe (up) and CdSe/ZnS (down) nanocrystals was investigated for OLA=oleylamine [$CH_3-(CH_2)_7-CH=CH-(CH_2)_8NH_2$], with a reaction temperature of 90-100° C. The nanocrystals were dispersed in Hex for the PL measurements. The results are shown in FIG. 19.

Figure 20:
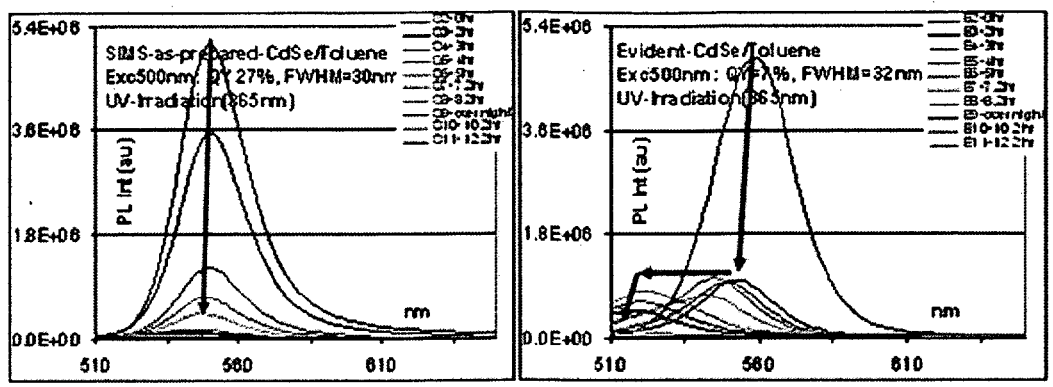
FIG. 20 is a comparative analysis showing the UV stability of nanocrystals.
Figure 21:
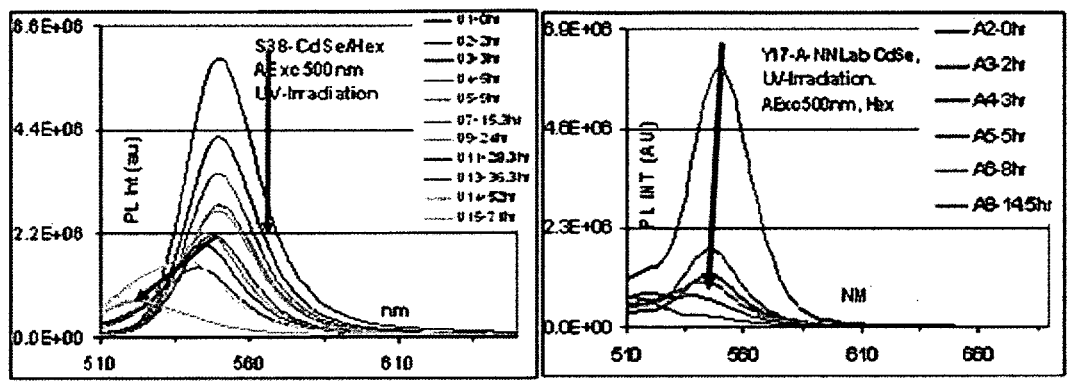
FIG. 21 another comparative analysis showing the UV stability of nanocrystals.

Comparative results are shown in FIGS. 20 and 21. FIG. 20 (left) shows the UV stability results for CdE nanocrystals made in accordance with the technique reported in (*J. Am. Chem. Soc.* 1993, 115, 8706-8715). FIG. 21 (left) shows the UV stability for nanocrystals made in accordance with the technique reported in 2001 (*J. Am. Chem. Soc.* 2001, 123, 183-184). By comparison nanocrystals made in accordance with the techniques of the invention are shown in FIG. 20 (right) and 21 (right). It will be seen that the invention results in a considerable improvement in UV stability.

Figure 22:
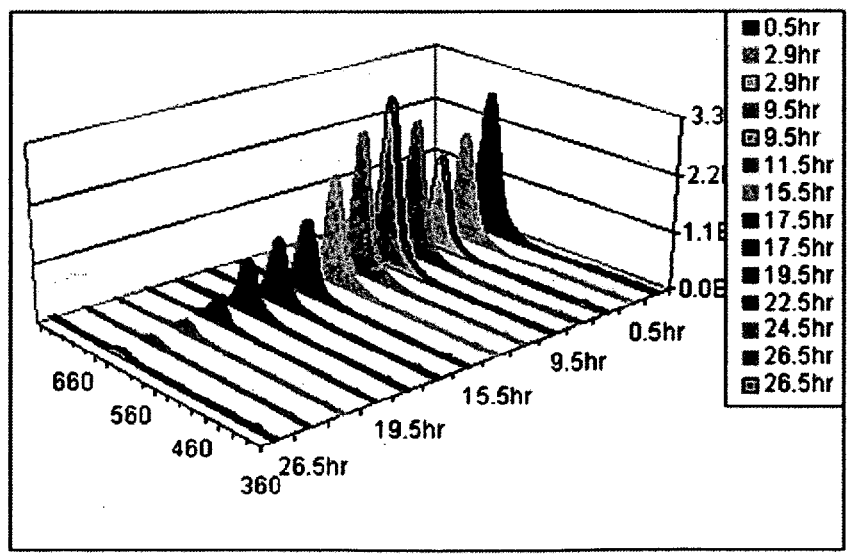
FIG. 22 shows the PL emission of CdZnSe nanocrystals in Hex after UV-irradiation.

FIG. 22 shows the UV stability of CdZnSe nanocrystals in Hex made by techniques in accordance with the invention after UV irradiation. The quantum dots used in FIG. 22 were synthesized with 0.039 g Se in 1.25 g TOP as the injection solution. ZnSt (Zn Sterate) 0.315 g and CdO 0.0642 in 6.25 g TOP and 7.5 g HAD amine (C18-amine) as the solution in a reaction flask.

It has been noted that the quality of the nanocrystals in accordance with the invention can be controlled by controlling the reaction conditions. The effect of the Cd-to-Se molar ratios on the formation of high-quality CdSe nanocrystals capped by TOP only, in terms of the control of size, the size distribution, and subsequent surface quality during growth will now be discussed. The surface quality is addressed by examining the PL properties including intensity and sensitivity, and the non-resonant Stokes shift (NRSS).

In the examination of the Cd:Se stoichiometry as affecting the formation kinetics and the optical properties of the resulting nanocrystals, the smallest Cd-to-Se molar ratio studied was 1:2, and the largest was 8:1. The TOP-capped CdSe nanocrystals exhibit an increase in size distribution during growth, as demonstrated by the increase in full width at half maximum (FWHM) of the PL spectra. With the smallest molar ratio of 1:2, the resulting nano-particles have a large size distribution even at the very initial stages of growth, and the size distribution increases significantly after a couple of minutes (min) of growth. With a 2:1 molar ratio, the growth in diameter is little (ca. 2.9 nm-2.9 nm) in the first five minutes, but increases (ca. 2.9 nm-3.4 nm) afterwards along with the size distribution. The temporal evolution of the PL intensity agrees with that reported: the lowest growth rate had the highest quantum yield (QY, representing the PL intensity). The ZGR was achieved between 1-4 min growth periods, as estimated by the redshift rate of the band-edge absorption and emission peaks; not surprisingly, the 3-min nanocrystals in Hex and 4-min ones in THF exhibit the highest PL intensity. With molar ratios of 4:1 and 6:1, the size of the nanocrystals increases slightly (ca. 2.9 nm-3.2 nm in diameter) between 0.5-20-min growth; in addition, the PL intensity in non-polar Hex changes slightly but increases in polar THF, for the growing nanocrystals of various growth periods (as long as a couple of hours). In particular, with a 4Cd-to-1Se molar ratio, the nanocrystals exhibit a nearly constant NRSS on the order of 40 meV±2 meV. With a 6Cd-to-1Se molar ratio, the nanocrystals exhibit a small size distribution and a small increase in the size distribution (as indicated by the full width at half maximum (FWHM) of 26 nm-29 nm in Hex and 25 nm-28 nm in THF, between 0.5-60 min growth), as well as small non-resonant Stokes shifts on the order of 30-40 meV; a continuous decrease in the NRSS (40-30 meV) is observed for nanocrystals during the 0.5-20 min growth period. Additionally, the nanocrystals from the syntheses with 2-8Cd:1Se molar ratios exhibit a decrease of the sensitivity on going from Hex to THF, as indicated by the decrease of the sensitivity index (SI) on the order of 80%-55% along growth. The present synthetic approach is excellent in terms of the control of the growth rate for the CdSe nanocrystals with high surface quality.

Using CdO as Cd source is much safer and easier for the syntheses of CdSe nanocrystals than using $Cd(CH_3)_2$. With CdO, the procedure involves nucleation at one temperature (NT) followed by a period of growth at a lower temperature (GT); neither acid nor TOPO is used. In a typical synthesis, a TOPSe/TOP solution was injected into a CdO/TOP solution at 300° C. In order to control the growth of the CdSe nanocrystals, the temperature of the reaction was then decreased to 250° C. The Se concentration in the total volume of the synthetic media was ca. 64, 32, 30, 32, 25, 26 mmol/kg for reactions with 1:2, 1:1, 2:1, 4:1, 6:1, and 8:1 molar ratios of Cd-to-Se, respectively. The optical properties of the growing nano-crystals were monitored with time as follows. Aliquots of the reaction solution were removed at different intervals (30 seconds to 2 hours) and kept in vials; afterwards a volume (1) of each sample was dispersed into the same volume (2) of solvent, and the UV and PL properties of the dispersions were studied at room temperature. UV spectra were acquired on a Perkin Elmer Lambda 45 UV-Vis spectrometer, and the PL spectra were acquired on a Fluoromax-3 spectrometer (Jobi Yvon Horiba, Instruments SA) under the same setting with a 450 W Xe lamp as the excitation source and an excitation wavelength of 350 nanometer (nm). Hexane (Hex) as well as tetrahydrofuran (THF) were used as the non-polar and polar media for dispersing the nanocrystals.

Figure 23:
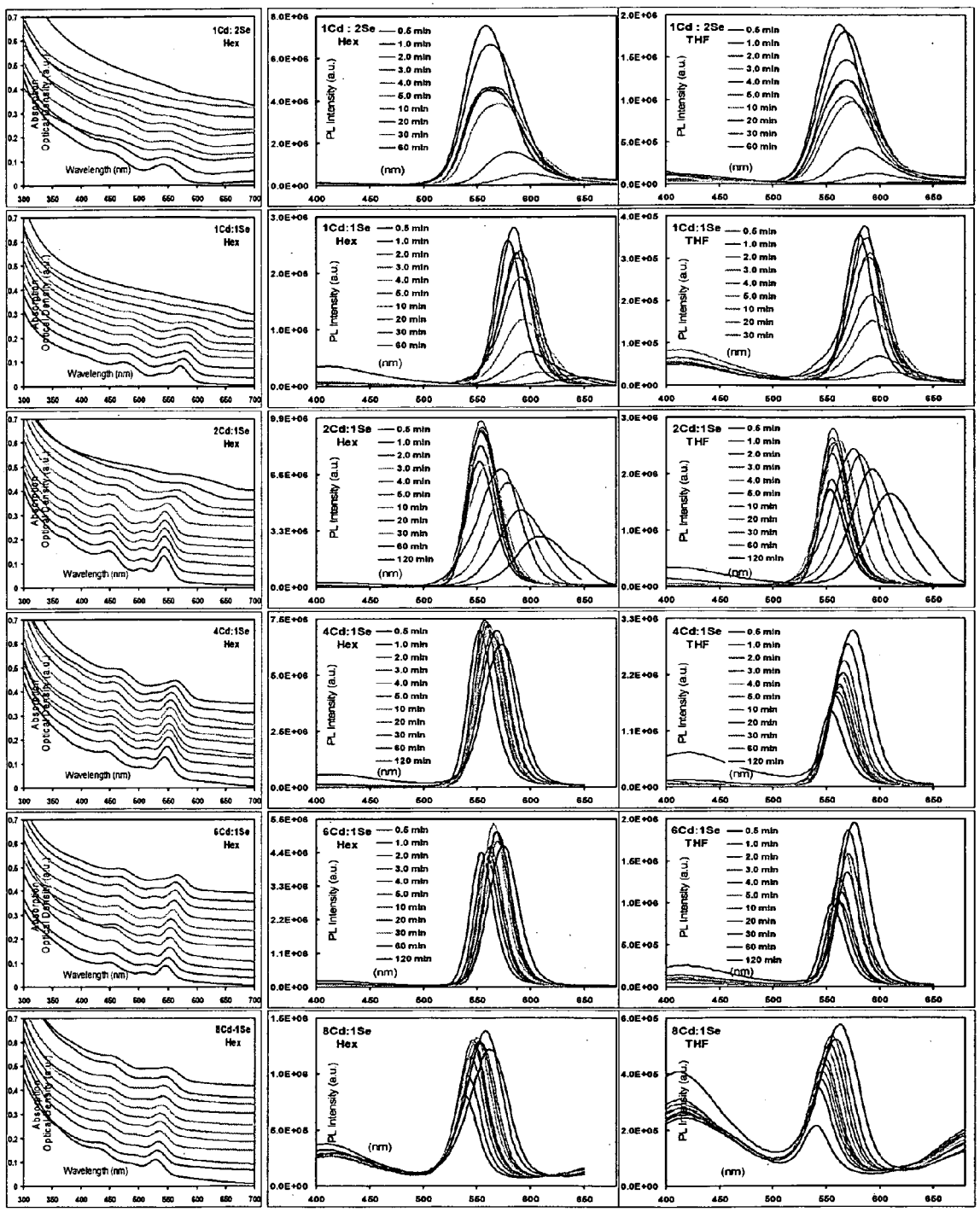
FIG. 23 shows the temporal evolution of the UV-vis absorption spectra in Hex (off-set, right), and the PL spectra in Hex (middle) and in THF (right) of the growing TOP-capped CdSe nanocrystals sampled at different growth periods.

Photoluminescence (PL) is a spontaneous emission process, and photon absorption and emission are closely related. FIG. 23 shows the absorption spectra (offset, left) and the corresponding emission spectra of the as-prepared CdSe nanocrystals dispersed in Hex (middle) and in THF (right). Because the absorption spectra of the Hex and THF dispersions are quite similar, the spectra presented are from Hex dispersions. From top to bottom in FIG. 23, the TOP-capped CdSe nanocrystal are from different synthetic batches with Cd-to-Se molar ratios increasing from small to large, namely 1:2, 1:1, 2:1, 4:1, 6:1, and 8:1. From one synthetic batch, the CdSe nanocrystals were sampled after different periods of growth.

Figure 24:
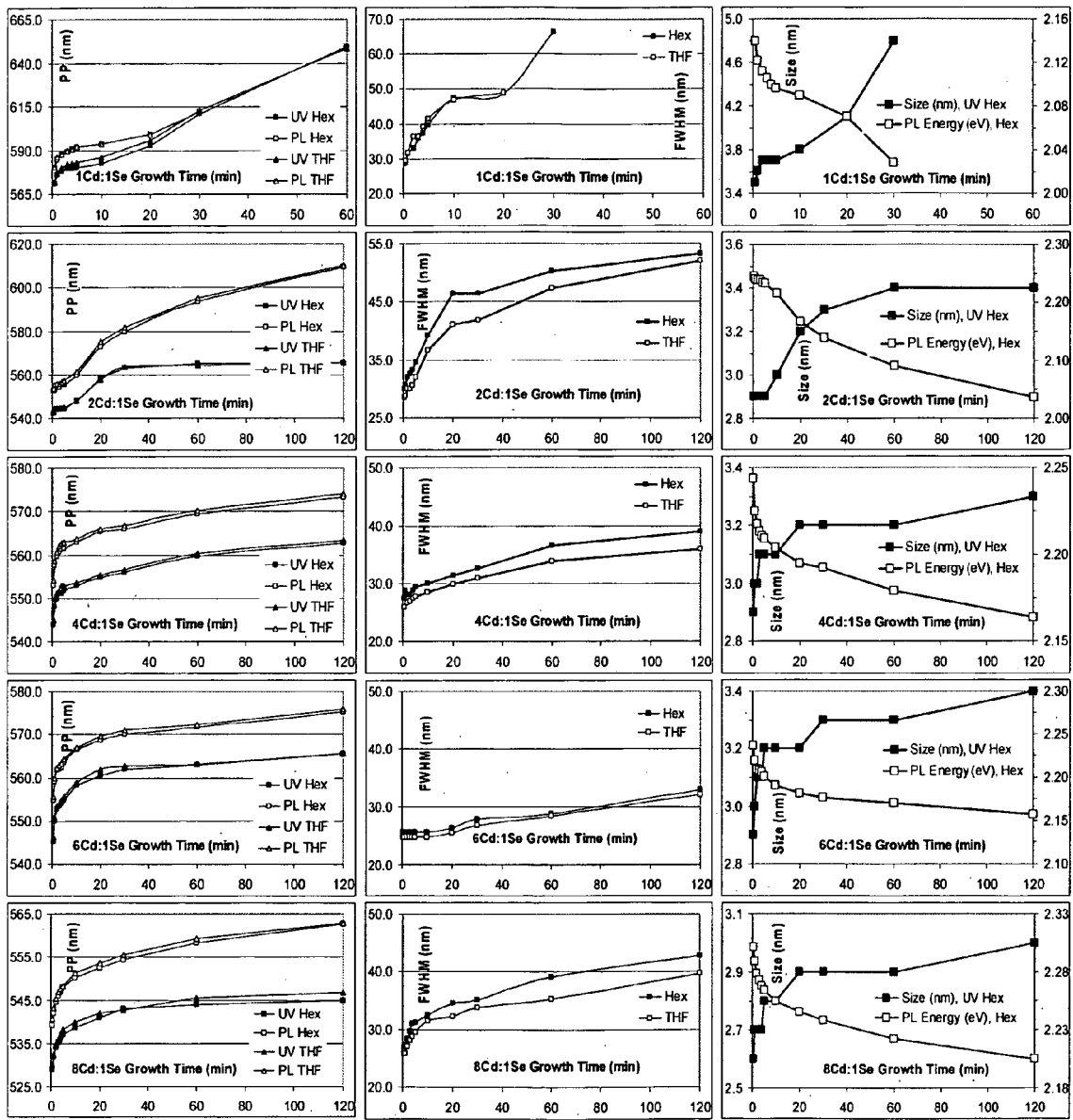
FIG. 24 shows the temporal evolution of: (left) the band-edge peak positions (PP, nm) of the absorption and emission, (middle) the FWHM, and (right) the average diameter in nm (left y axis) and emission energy in eV (right y axis), of the growing TOP-capped CdSe nanocrystals from the various reactions shown in FIG. 23, 1Cd-to-2Se synthesis omitted.
Figure 25:
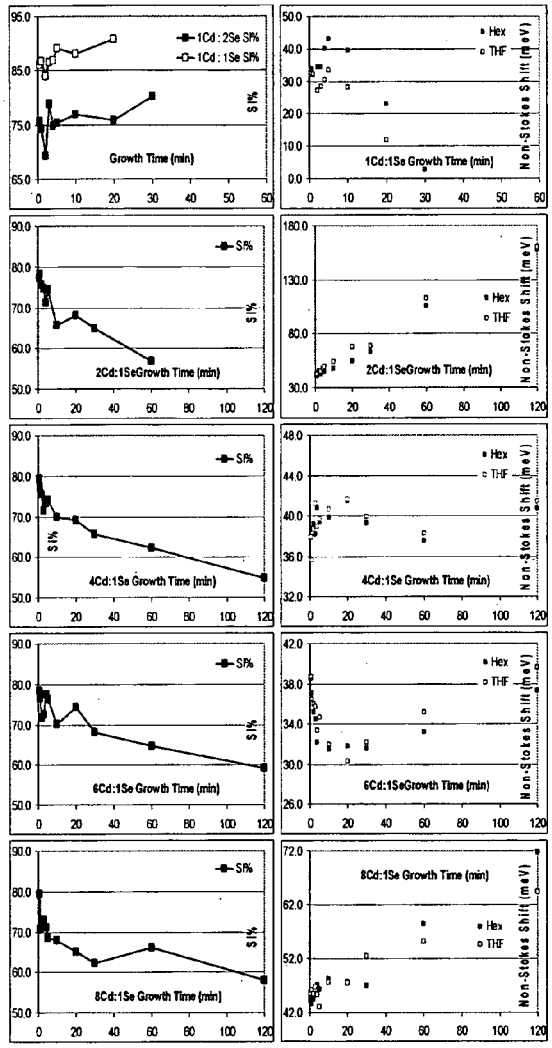
FIG. 25 shows the temporal evolution of the SI (left) and the non-resonant Stokes shifts in meV (right) of the growing TOP-capped CdSe nanocrystals from the reactions shown in FIG. 23.

The evolution of the optical properties consisting of absorption and emission with time is indicative of the formation and growth kinetics of the nanocrystals. Thus, comparisons of the temporal evolution of the optical properties of the nanocrystals from the various synthetic batches are described below, in the order of increasing Cd-to-Se molar ratios, showing absorption (peak positions and fine structure), and emission (peak positions, full width at half maximum (FWHM), and intensity). The first absorption peak at the smallest energy in each absorption curve is simply denoted as the absorption peak. The temporal evolution of the peak positions of the band-edge absorption and emission, the FWHM of the PL spectra, and the average diameter (extracted from the absorption peaks in Hex) together with the emission energy in Hex, is summarized on the left, center, and right, respectively, of FIG. 24. From top to bottom in FIG. 24, the TOP-capped CdSe nanocrystals are from synthetic batches with Cd-to-Se molar ratios from small to large, namely 1:1, 2:1, 4:1, 6:1, and 8:1. The nanocrystals from the 1Cd:2Se molar ratio reaction have not been summarized in FIG. 24 because of an ambiguity in the determination of the absorption and emission peak positions. Such uncertainty arises from the broadening in the absorption and emission spectra.

An alternative approach for the exploration of the growth kinetics is presented in Tables 1 and 2, which summarize the red shifts of the absorption and emission peak positions of the growing nanocrystals, respectively. The redshift of the emission peak position is more sensitive than that of the absorption peak position, particularly for the nanocrystals at late stages of growth. Moreover, an alternative approach for the assessment of the progress of the size distribution is presented in Table 3, which summarizes the change of the FWHM of the growing nanocrystals from various synthetic batches.

TABLE 1

| APPS | 1-2 | | 1-1 | | 2-1 | | 4-1 | | 6-1 | | 8-1 | |
| --- | --- | --- | --- | --- | --- | --- | --- | --- | --- | --- | --- | --- |
| GT (min) | Hex | THF | Hex | THF | Hex | THF | Hex | THF | Hex | THF | Hex | THF |
| 0.5 | 544 | 544 | 571 | 572 | 543 | 543 | 544 | 545 | 545 | 546 | 529 | 530 |
| 0.5-1 | 2 | 2 | 5 | 5 | 1 | 1 | 4 | 5 | 5 | 5 | 3 | 2 |
| 0.5-2 | 4 | 3 | 7 | 8 | 1 | 2 | 6 | 6 | 7 | 7 | 5 | 5 |
| 0.5-3 | 4 | 3 | 9 | 10 | 1 | 2 | 7 | 7 | 8 | 8 | 6 | 6 |
| 0.5-4 | 4 | 3 | 9 | 10 | 2 | 2 | 7 | 8 | 9 | 9 | 7 | 7 |
| 0.5-5 | 6 | 3 | 9 | 11 | 2 | 2 | 8 | 8 | 10 | 9 | 8 | 8 |
| 0.5-10 | 8 | 4 | 12 | 14 | 6 | 5 | 9 | 9 | 13 | 13 | 10 | 10 |
| 0.5-20 | — | 31 | 22 | 24 | 16 | 15 | 11 | 10 | 15 | 16 | 12 | 12 |
| 0.5-30 | — | — | 40 | 41 | 21 | 20 | 12 | 12 | 17 | 16 | 14 | 13 |
| 0.5-60 | — | — | 79 | 76 | 23 | 21 | 16 | 15 | 18 | 17 | 15 | 15 |
| 0.5-120 | — | — | — | NA | 23 | 22 | 19 | 18 | 20 | 19 | 16 | 17 |

TABLE 2

| EPPS | 1-2 | | 1-1 | | 2-1 | | 4-1 | | 6-1 | | 8-1 | |
| --- | --- | --- | --- | --- | --- | --- | --- | --- | --- | --- | --- | --- |
| GT (min) | Hex | THF | Hex | THF | Hex | THF | Hex | THF | Hex | THF | Hex | THF |
| 0.5 | 558 | 562 | 580 | 581 | 553 | 554 | 553 | 554 | 555 | 556 | 539 | 541 |
| 0.5-1 | 5 | 6 | 5 | 5 | 1 | 2 | 5 | 5 | 4 | 4 | 3 | 3 |
| 0.5-2 | 5 | 7 | 8 | 7 | 2 | 2 | 7 | 7 | 7 | 7 | 5 | 5 |
| 0.5-3 | 5 | 7 | 9 | 9 | 2 | 2 | 8 | 8 | 7 | 7 | 7 | 6 |
| 0.5-4 | 5 | 7 | 11 | 10 | 3 | 3 | 8 | 9 | 8 | 8 | 8 | 7 |
| 0.5-5 | 6 | 8 | 12 | 12 | 3 | 4 | 9 | 9 | 9 | 9 | 9 | 8 |
| 0.5-10 | 12 | 12 | 14 | 13 | 7 | 8 | 10 | 10 | 12 | 11 | 11 | 11 |
| 0.5-20 | 24 | 19 | 19 | 19 | 20 | 22 | 12 | 12 | 14 | 14 | 13 | 13 |
| 0.5-30 | 39 | 33 | 32 | 31 | 27 | 28 | 13 | 13 | 15 | 15 | 15 | 15 |

TABLE 2-continued

| EPPS | 1-2 | | 1-1 | | 2-1 | | 4-1 | | 6-1 | | 8-1 | |
|---|---|---|---|---|---|---|---|---|---|---|---|---|
| GT (min) | Hex | THF | Hex | THF | Hex | THF | Hex | THF | Hex | THF | Hex | THF |
| 0.5-60 | 67 | 64 | — | — | 41 | 41 | 16 | 16 | 17 | 17 | 19 | 19 |
| 0.5-120 | — | — | — | — | 57 | 56 | 20 | 20 | 21 | 20 | 24 | 22 |

TABLE 3

| FWHM | 1-2 | | 1-1 | | 2-1 | | 4-1 | | 6-1 | | 8-1 | |
|---|---|---|---|---|---|---|---|---|---|---|---|---|
| GT (min) | Hex | THF | Hex | THF | Hex | THF | Hex | THF | Hex | THF | Hex | THF |
| 0.5 | 48 | 46 | 29 | 30 | 30 | 28 | 27 | 26 | 26 | 25 | 27 | 26 |
| 0.5-1 | 8 | 6 | 3 | 2 | 1 | 0 | 1 | 1 | 0 | 0 | 1 | 0 |
| 0.5-2 | 9 | 7 | 4 | 7 | 2 | 2 | 1 | 1 | 0 | 0 | 2 | 1 |
| 0.5-3 | 11 | 8 | 7 | 7 | 3 | 2 | 1 | 1 | 0 | 0 | 3 | 2 |
| 0.5-4 | 12 | 9 | 9 | 10 | 3 | 2 | 1 | 2 | 0 | 0 | 4 | 3 |
| 0.5-5 | 14 | 10 | 11 | 12 | 5 | 4 | 2 | 2 | 0 | 0 | 4 | 4 |
| 0.5-10 | 15 | 11 | 19 | 17 | 9 | 8 | 3 | 3 | 0 | 0 | 6 | 6 |
| 0.5-20 | 11 | 8 | 20 | 19 | 16 | 13 | 4 | 4 | 1 | 1 | 8 | 6 |
| 0.5-30 | 8 | 8 | — | — | 16 | 13 | 5 | 5 | 2 | 2 | 8 | 8 |
| 0.5-60 | — | — | — | — | 20 | 19 | 9 | 8 | 3 | 4 | 12 | 9 |

In order to investigate the growth rate of the growing nanocrystals, the rate of the redshift (in Å per min) of the absorption and emission peak positions is calculated for each growth interval, of which samples were taken:

$$R_{i-i+j} = \Delta P/\Delta GT = (P_{i+j} - P_i) \cdot 10/(GT_{i+j} - GT_i) \quad (1)$$

with $P_i$ the peak position in nm at growth time of $GT_i$ in min, and $P_{i+j}$ the next peak position in nm at the next growth time $GT_{i+j}$ in min. The rate of the redshift is summarized in Tables 4 (absorption, APPSR) and 5 (emission, EPPSR). In general, the values of APPSR and EPPSR are small during the early stages of growth (0.5-5 min, less than 0.3 Å/min), but they increase considerably at the later stages of growth. Thus, it seems reasonable to comment that the growth rate is small in the early stages but becomes large at the late stages, under the Present Experimental Conditions and Growth-Time Scale (PECGTS) monitored.

size distribution; the FWHM of the corresponding band-edge PL is on the order of ca. 48 nm in Hex and ca. 46 nm in THF (Table 3). During growth, the absorption peak broadens significantly and the absorption spectra gradually lose fine structure, indicating that an increase in the size distribution is manifest. At the same time, the PL spectra broaden considerably; the FWHM for the 1-min nanocrystals is on the order of ca. 56 nm in Hex and ca. 52 nm in THF. On going from Hex to THF (Table 2), the nanocrystals exhibit relatively large red shifts of the emission peak (between 4-6 nm), as compared to the nanocrystals from the other synthetic batches. Such large difference of the emission peak position may indicate that the surface quality is not good. The 0.5-min nanocrystals in both Hex and THF display the largest PL intensity; afterwards, the PL intensity decreases monotonically during growth.

TABLE 4

| APPSR | 1-2 | | 1-1 | | 2-1 | | 4-1 | | 6-1 | | 8-1 | |
|---|---|---|---|---|---|---|---|---|---|---|---|---|
| GT (min) | Hex | THF | Hex | THF | Hex | THF | Hex | THF | Hex | THF | Hex | THF |
| 0.5-1 | 0.1 | 0.1 | 0.3 | 0.3 | 0.1 | 0.1 | 0.2 | 0.2 | 0.2 | 0.2 | 0.1 | 0.1 |
| 1-2 | 0.2 | 0.1 | 0.2 | 0.3 | 0.0 | 0.0 | 0.2 | 0.1 | 0.3 | 0.2 | 0.2 | 0.2 |
| 2-3 | 0.0 | 0.0 | 0.2 | 0.2 | 0.0 | 0.0 | 0.1 | 0.1 | 0.1 | 0.1 | 0.1 | 0.1 |
| 3-4 | 0.0 | 0.0 | 0.0 | 0.1 | 0.0 | 0.0 | 0.0 | 0.1 | 0.1 | 0.1 | 0.1 | 0.1 |
| 4-5 | 0.2 | 0.0 | 0.0 | 0.1 | 0.0 | 0.0 | 0.1 | 0.0 | 0.1 | 0.1 | 0.1 | 0.1 |
| 5-10 | 1.0 | 0.5 | 1.4 | 1.6 | 1.8 | 1.5 | 0.6 | 0.3 | 1.7 | 1.6 | 0.9 | 0.9 |
| 10-20 | — | 27.2 | 9.8 | 9.9 | 10.6 | 9.6 | 1.8 | 1.8 | 2.2 | 3.0 | 2.3 | 2.3 |
| 20-30 | — | — | 18.4 | 17.2 | 4.6 | 5.6 | 1.2 | 1.2 | 1.3 | 0.8 | 2.0 | 0.6 |
| 30-60 | — | — | 115.4 | 105.5 | 5.6 | 3.1 | 11.0 | 11.0 | 3.5 | 1.7 | 3.0 | 8.6 |
| 60-120 | — | — | — | — | 2.4 | 7.0 | 18.5 | 18.4 | 14.8 | 14.3 | 6.0 | 6.9 |

FIG. 22 shows that the absorption spectra of the TOP-capped CdSe nanocrystals prepared at a molar ratio of 1Cd:2Se are not rich in fine structure. The absorption peak position of the 0.5-min nanocrystals is ca. 544 nm in both Hex and THF (Table 1), indicative of a ca. 2.9 nm diameter. In addition, the absorption peak is broad, signifying a broad In the casese of Cd-to-1Se Synthesis, a for a 1Cd:1Se molar ratio, the absorption spectra possess fine structure up to a 20-min reaction time. The absorption peak position of the 0.5-min nanocrystals is ca. 571 nm in Hex, indicative of a ca. 3.5 nm diameter, relatively large compared to the nano-particles of the same age but from reactions using different Cd-to-Se molar ratios. Further investigations of the 1Cd-to-1Se synthesis producing relative large nanocrystals with relative low PL intensity have been carried out. During growth, the FWHM of the band-edge PL increases, indicating a broadening in size distribution; the 0.5-min ensemble displays a reasonable size distribution with the FWHM on the order of ca. 29 nm in Hex and ca. 30 nm in THF, but the 5-min ensemble displays significant broadening, with the FWHM on the order of ca. 40 nm in Hex and ca. 42 nm in THF. The nanocrystals display a slight enhancement in FWHM on going from Hex to THF, in contrast to those from the syntheses with different Cd-to-Se molar ratios.

Te PL intensity increases monotonically to a maximum value and then decreases: the 1-min nanocrystals (in both Hex and THF) display the largest PL intensity; the 2-min, 3-min, and 4-min nanocrystals in Hex exhibit a similar PL intensity, while the PL intensity of the 3-min and 4-min ensembles in THF is similar. Significant decrease takes place after 5-min of growth; such decrease coincides well with the increase of the rate of the redshift of the absorption and emission peak positions shown in Tables 4 (APPSR, Å/min) and 5 (EPPSR, Å/min): before 5 min, the APPSR and EPPSR are smaller than 0.3 Å/min; afterwards, they increase significantly.

0.5-20 min growth). Interestingly, the value of the FWHM is larger in Hex than that in THF: ca. 2-3 nm for the 0.5-to-10 min nanocrystals but there is a larger difference (4-5 nm) for the 20-min and 30-min nanocrystals. It seems to be general characters of the phenomena observed: the TOP-capped CdSe nanocrystals in Hex exhibit a larger FWHM than in THF, in additional, such FWHM difference is relatively small for young nanocrystals as compared for old ones. Furthermore, the increase of the FWHM during growth is detected more easily in Hex than in THF.

The PL intensity increases monotonically to a maximum value and then decreases: the 3-min nanocrystals display the strongest PL intensity in Hex but the 4-min ensemble is the strongest in THF; the PL intensity decreases considerably after 5-minute of growth. It is interesting to point out that the 3 and 4-min nanocrystals exhibit the strongest PL intensity among the syntheses performed (FIG. 23). The present experimental observation on the temporal evolution of the PL intensity seems to be in good agreement with that reported: the lowest growth rate had the highest intensity because of to the lowest degree of surface disorder. As mentioned before, the CdSe samples with TOPO and TOP as the surface capping ligands were size-selected fractions from one growth ensemble. For the various fractions, the

TABLE 5

| EPPSR | 1-2 | | 1-1 | | 2-1 | | 4-1 | | 6-1 | | 8-1 | |
|---|---|---|---|---|---|---|---|---|---|---|---|---|
| GT (min) | Hex | THF | Hex | THF | Hex | THF | Hex | THF | Hex | THF | Hex | THF |
| 0.5-1 | 0.3 | 0.3 | 0.2 | 0.3 | 0.1 | 0.1 | 0.2 | 0.2 | 0.2 | 0.2 | 0.1 | 0.1 |
| 1-2 | 0.0 | 0.1 | 0.3 | 0.2 | 0.1 | 0.1 | 0.2 | 0.2 | 0.3 | 0.2 | 0.3 | 0.2 |
| 2-3 | 0.0 | 0.0 | 0.2 | 0.2 | 0.0 | 0.0 | 0.1 | 0.1 | 0.0 | 0.1 | 0.1 | 0.2 |
| 3-4 | 0.0 | 0.0 | 0.2 | 0.1 | 0.1 | 0.1 | 0.1 | 0.1 | 0.0 | 0.0 | 0.1 | 0.1 |
| 4-5 | 0.1 | 0.1 | 0.1 | 0.1 | 0.0 | 0.1 | 0.0 | 0.0 | 0.1 | 0.1 | 0.1 | 0.1 |
| 5-10 | 3.3 | 2.3 | 0.9 | 0.9 | 2.2 | 2.2 | 0.7 | 0.4 | 1.4 | 1.3 | 1.1 | 1.4 |
| 10-20 | 12.0 | 6.7 | 5.4 | 5.4 | 12.7 | 13.7 | 2.3 | 2.2 | 2.4 | 2.7 | 2.3 | 2.4 |
| 20-30 | 14.8 | 14.1 | 12.6 | 12.6 | 7.3 | 6.3 | 0.7 | 0.8 | 1.3 | 1.3 | 1.9 | 1.8 |
| 30-60 | 84.4 | 91.7 | 108.4 | 101.9 | 41.2 | 40.3 | 10.0 | 10.2 | 4.9 | 4.1 | 11.7 | 11.1 |
| 60-120 | — | — | — | — | 93.1 | 89.8 | 24.3 | 24.0 | 21.8 | 22.0 | 26.5 | 21.3 |

In the case of Cd-to-1Se Synthesis with a 2Cd:1Se molar ratio, the absorption spectra have fine structure up to a reaction time of 60-min. The absorption peak position for the 0.5-min nanocrystals is ca. 543 nm in both Hex and THF, indicative of a ca. 2.9 nm diameter; the size distribution is reasonable with a FWHM of ca. 30 nm in Hex and 28 nm in THF. During the first 5-minute growth period, the absorption and emission peaks both show slight red shifts, ca. 2 nm and 3 nm in Hex, respectively, and ca. 2 nm and 4 nm in THF, respectively. Such red shifts for reaction times between 0.5-5 min are the smallest among the various reactions (Tables 1 and 2), indicating the least growth in size. Afterwards, the growth in size increases: the 10-min and subsequent ensembles display obvious red shifts, together with clear PL spectral broadening. Regarding the growth rate, it seems reasonable to state that the zero growth rate (ZGR) is achieved for the 1-min to 4-min nanocrystals, as shown in Tables 4 and 5.

The FWHM of the PL spectra for the 10-min nanocrystals is on the order of 39 nm in Hex and 37 nm in THF. Regarding the FWHM of the band-edge PL, it increases during growth, indicative of a continuous increase in the size distribution; the increase in the FWHM is relatively small at the early stages of growth (ca. 9 nm in Hex and 8 nm in THF between 0.5-10 min growth) as compared to the late stages of growth (ca. 16 nm in Hex and 13 nm in THF between degree of change in surface capping by TOP and TOPO is in some doubt, although the authors tried to keep the TOP concentration constant (5-10 wt %) during the precipitation. Therefore, it seems reasonable to declare that our approach, using as-prepared samples, is much simpler and more persuasive in terms of the highest PL intensity resulting from the growing CdSe nanocrystals with the best surface quality due to the lowest growth rate.

Continuing with the analysis of the present syntheses in TOP only, with a 2Cd:1Se molar ratio, significant decrease in the PL intensity in Hex and in THF takes place after 5-min of growth; such decrease also coincides well with the increase of the rate of the redshift of the absorption and emission peak positions shown in Tables 4 and 5: before 5 min, the APPSR and EPPSR are smaller than 0.1 Å/min; afterwards, they increase significantly (larger than 1.5 Å/min). The realization of ZGR of the TOP-capped CdSe nanocrystals with high PL intensity from the 2Cd-to-1Se synthesis is worthy of note.

The nanocrystals from the 4Cd:1Se molar ratio synthesis show the absorption spectra having fine structure for all growth periods. The absorption peak position for the 0.5-min nanocrystals is ca. 544 nm in Hex and 545 nm in THF (Table 1), indicative of a ca. 2.9 nm diameter; the size distribution is reasonably samll with a FWHM of ca. 27 nm in Hex and 26 nm in THF (Table 3). During the 0.5-min to 60-minute growth period, the absorption and emission peaks are slightly red shifted, ca. 16 nm and 16 nm in Hex, respectively, and ca. 15 and 16 nm in THF, respectively. The red shifts for products obtained between 0.5-60 min reaction time are the least for the various reactions (Tables 1 and 2), indicating the least growth in size. Such least growth may be due to a slow growth rate in the late stages (5 min-60 min), as characterized by the APPSR (Table 4) and EPPSR (Table 5) between 0.3-11.0 Å/min, the value of which is relatively small as compared to those of the nanocrystals from the reactions using different Cd-to-Se molar ratios.

In addition, the FWHM of the band-edge PL increases from 27 nm to 28 nm in Hex and from 26 nm to 28 nm in THF, during 0.5-4 min growth periods, as well as from 29 nm to 37 nm in Hex and from 28 nm to 34 nm in THF, indicative of a continuous increase in size distribution during 5-60 min growth periods. The value of the FWHM in Hex is ca. 1 to 2 nm larger than that in THF for the 0.5-min to 30-min growth period, and is ca. 3 nm larger for the older nanocrystals.

The PL intensity in Hex is reasonably constant, but increases monotonically in THF; a close inspection shows that the 3-, 4-, and 5-min nanocrystals in THF exhibit a similar PL intensity, also the 10- and 20-min nanocrystals in THF show a similar PL intensity. The different patterns in temporal evolution of the PL intensity detected in Hex and in THF should be noted: a continuous increase in THF and a nearly constant in Hex. Such difference may be related to the slow growth rate during the entire reaction period. It is easy to understand that each synthesis takes a certain period of time during growth at a high temperature and a certain period of time to cool to room temperature. Therefore, the temporal evolution of the PL intensity of the nanocrystals from the 4Cd-to-1Se synthesis, namely a nearly constant PL intensity in Hex and an increase in THF, indicates that the 4Cd-to-1Se ratio is better, for a practical fabrication aiming at high PL intensity, than those with the 2Cd-to-1Se, 1Cd-to1Se, and 1Cd-to-2Se syntheses. Consequently, the reaction with a 4Cd:1Se molar ratio is excellent for a large-scaled production in terms of the control of size growth of CdSe nanocrystals with high PL efficiency.

In the case of 6Cd-to-1Se Synthesis, with a 6Cd:1-Se molar ratio, the optical density of the absorption peak is relatively small due to a relatively low Se concentration; however, the absorption spectra also have fine structure for all growth periods, including the 120-min CdSe ensemble. The absorption peak position for the 0.5-min nanocrystals is ca. 545 nm in Hex (and ca. 546 nm in THF), indicative of a ca. 2.9 nm diameter; the size distribution is extremely low with a FWHM of ca. 26 nm in Hex and 25 nm in THF. During the 60-minute growth, the absorption and emission peaks are red-shifted slightly, ca. 18 nm and 17 nm in Hex, respectively, and ca. 17 nm in THF. Such red shifts for growth periods between 0.5-60 min are the second smallest for the various reactions. Such small growth may be also due to a slow growth rate in the late stages (5 min-60 min), as shown in Tables 4 and 5: the APPSR and EPPSR are between 1.3-4.9 Å/min, while the APPSR and EPPSR are smaller than 0.3 Å/min during the early stages (0.5-5 min).

At the same time, the FWHM of the band-edge PL changes little between 0.5-10 min growth periods (Table 3), but increases slightly afterwards from 26 nm to 29 nm in Hex and from 25 nm to 28 nm in THF, indicative of a small increase in the size distribution. This is the least increase in the FWHM during growth for the various reactions and is worthy of notice. On going from Hex to THF results in an increase of ca. 1 nm in FWHM, which is the smallest increase amongst the various syntheses (Table 3).

Similar to the pattern of nanocrystals from the 4Cd-to-1Se synthesis, that of the temporal evolution of the PL intensity detected in Hex and in THF is different: nearly constant in Hex and an enhancement in THF. Hence, the nanocrystals from the 6Cd:1Se molar ratio synthesis possess the smallest size distribution and the smallest increase in the size distribution during growth. Therefore, the 6Cd:1Se molar ratio synthesis is excellent for controlling the size distribution as well as the size growth of TOP-capped CdSe nanocrystals with good PL efficiency.

In the case of 8Cd-to-1Se Synthesis, with the 8Cd:1Se molar ratio, the absorption spectra are similar to those from the 6Cd:1Se molar ratio concerning fine structure. The absorption peak position of the 0.5-min nanocrystals is ca. 529 nm in Hex (and ca. 530 nm in THF), indicative of a ca. 2.4 nm diameter; the size distribution is reasonable with a FWHM of ca. 27 nm in Hex and 26 nm in THF. During the 60-minute growth, the absorption and emission peaks red shift slightly, ca. 16 nm and 19 nm in Hex, respectively, and ca. 15 and 19 nm in THF, respectively. Regarding the FWHM of the band-edge PL, it increases during growth from 27 nm to 39 nm in Hex and from 26 nm to 35 nm in THF, indicative of a continuous increase in size distribution. A considerable rise in base line of the PL spectra around 412 nm may be indicative of the appearance of very small particles; furthermore, a significant rise in the base line of the PL spectra around 700 nm may be indicative of the appearance of large particles or due to "deep trap" emission. The rise in the base line at both sides of the band-edge emission, namely ca. 412 nm and 700 nm, is more evident in THF than in Hex. The pattern of the temporal evolution of the PL intensity detected in Hex and in THF is similar. In Hex, the PL intensity increases for 3 minutes; afterwards, it becomes constant until a reaction time of 30 minutes is reached. In THF, the PL intensity increases up to 20 minutes; afterwards, it becomes constant up to 30 minutes.

Under the Present Experimental Conditions and Growth-Time Scale (PECGTS) monitored, the size growth rate of the TOP-capped CdSe nanocrystals is extremely slow at the early stages (0.5-5 min), with the redshift rate of the band-edge absorption and emission peak positions smaller than 0.3 Å/min. The TOP-capped CdSe nanocrystals from the syntheses with the 1Cd:2Se and 1Cd:1Se molar ratios have relatively large size distributions. The nanocrystals from the synthesis with the 8Cd:1Se molar ratio exhibit PL but with rises in the base line of the PL spectra. The synthesis with the 2Cd:1Se molar ratio is good for the realization of zero growth rate (ZGR) in the early stages (1-4 minutes) of growth. The syntheses with the 4Cd:1Se and 6Cd:1Se molar ratios are excellent in the control of the size growth and size distribution to target high PL efficiency during the entire growth stages (on the order of one hour).

On going from Hex to THF, the TOP-capped CdSe nanocrystals from the various reactions exhibit small red shifts for both the absorption and emission peaks; in addition, they exhibit slight increases of the FWHM, except for those from the 1Cd:1Se synthesis. Regarding the PL intensity, there is a substantial decrease, suggesting that the surface defects are more exposed in THF. The percentage decrease in PL intensity on going from Hex to THF is termed the Sensitivity Index (SI) as expressed by $$SI = \Delta I / I_{Hex} = (I_{Hex} - I_{THF}) / I_{Hex} \quad (2)$$

where $I_{Hex}$ and $I_{THF}$ are the PL intensity (integrated area) in Hex and in THF, respectively. Accordingly, the sensitivity index of the TOP-capped CdSe nanocrystals from the various synthetic batches is calculated from Equation 2 and is presented in the left part of FIG. 3; from top to bottom, the TOP-capped CdSe nanocrystal are from the synthetic batches with the increase of the precursor Cd-to-Se molar ratios, namely 1:2 and 1:1; 2:1, 4:1, 6:1, and 8:1. With the 1Cd:2Se and 1Cd:1Se molar ratios, the SI seems to be constant on the order of 65-80% and 80-95%, respectively, during growth. However, with the 2-8Cd:1Se molar ratios, the SI seems to decrease during growth (ca. 80-55%). The SI can be used as a semi-quantitative parameter to estimate the surface "quality" concerning the number of sites with weakly bound ligands that are exposed: the smaller the SI, the less the surface sites are exposed, and the better the quality of the nanocrystals. Therefore, regarding surface quality, reactions using large Cd-to-Se molar ratios (such as 2-8:1) are better than those with small ratios (such as 1:1-2). Such a conclusion is also based on the face that each practical batch takes a certain period of time during growth at a high temperature and a certain period of time to cool to room temperature.

There are size-dependent redshifts from band edge absorption to band edge emission, and the energy difference between the band-edge peaks of the absorption and emission is the so-called non-resonant Stokes Shift (NRSS). Similar to the explanation of the origin of the band-edge emission of CdSe quantum dots or nanocrystals, two models, surface-related and exciton-related, have been used to elucidate the NRSS. The surface-related model attributes the NRSS to the recombination of surface-localized carriers, while the internal core-related model argues about several factors including the intrinsic size distribution. A theoretical calculation based on the core-related model suggests 40-30 meV for CdSe quantum dots with the size of 2.8-3.4 nm in diameter.

Thus, the NRSSs of the TOP-capped CdSe nanocrystals from the various synthetic batches dispersed in both Hex and THF are calculated and presented in the right part of FIG. 3; from top to bottom, the TOP-capped CdSe nanocrystal are from the synthetic batches with increasing the precursor Cd-to-Se molar ratios, namely 1:1, 2:1, 4:1, 6:1, and 8:1. The 0.5-min (2.9 nm) and 1-min (3.0 nm) ensembles from the 1Cd-to-2Se synthesis exhibit non-resonant. Stokes shifts on the order of ca 60 meV and 72 meV in Hex, respectively, while ca. 74 meV and 88 meV in THF, respectively. The reason for the larger TOP-capped nanocrystals exhibit larger rather than smaller NRSSs may be due to a larger size distribution, as indicated by the lose of the fine structures in the absorption spectra and the FWHM of the PL spectra (FIG. 1 and Table 3). The nanocrystals from the 2-8Cd:1Se synthetic batches, especially for those with growth less than 30 minutes, exhibit NRSSs almost insensitive to the dispersion media. The nanocrystals (2.9-3.4 nm in diameter) from the 2Cd:1Se synthesis also exhibit an increase of the NRSS (ca. 42 meV-115 meV) during growth within 60 minutes, while those (2.9-3.3 nm in diameter) from the 4Cd:1Se synthesis exhibit an almost constant NRSS (ca. 40 nm±2 meV) during growth. The nanocrystals (2.9-3.4 nm in diameter) from the 6Cd:1Se synthesis exhibit a decrease of the NRSS (ca. 40 meV-30 meV) during growth between 0.5-20 minutes; afterwards, the nanocrystals exhibit an increase of the NRSS (ca. 30 meV-40 meV). The nanocrystals (2.6-2.9 rim in diameter) from the 8Cd:1Se synthesis exhibit an increase of the NRSS (ca. 42 meV-54 meV) during growth within 60 minutes. Again, it may be the increase of the size polydispersity that causes the increase of the NRSS during growth rather than decrease.

Figure 26:
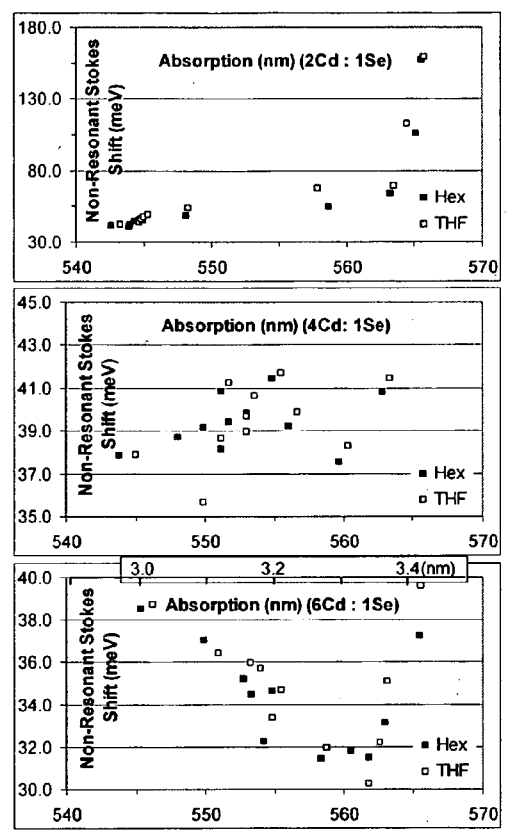
FIG. 26 shows the non-resonant Stokes shift (meV) versus absorption peak (nm) for the nanocrystals from the syntheses with 2, 4, and 6Cd:1Se molar ratios, upper, middle, and lower parts, respective1.
Figure 27:
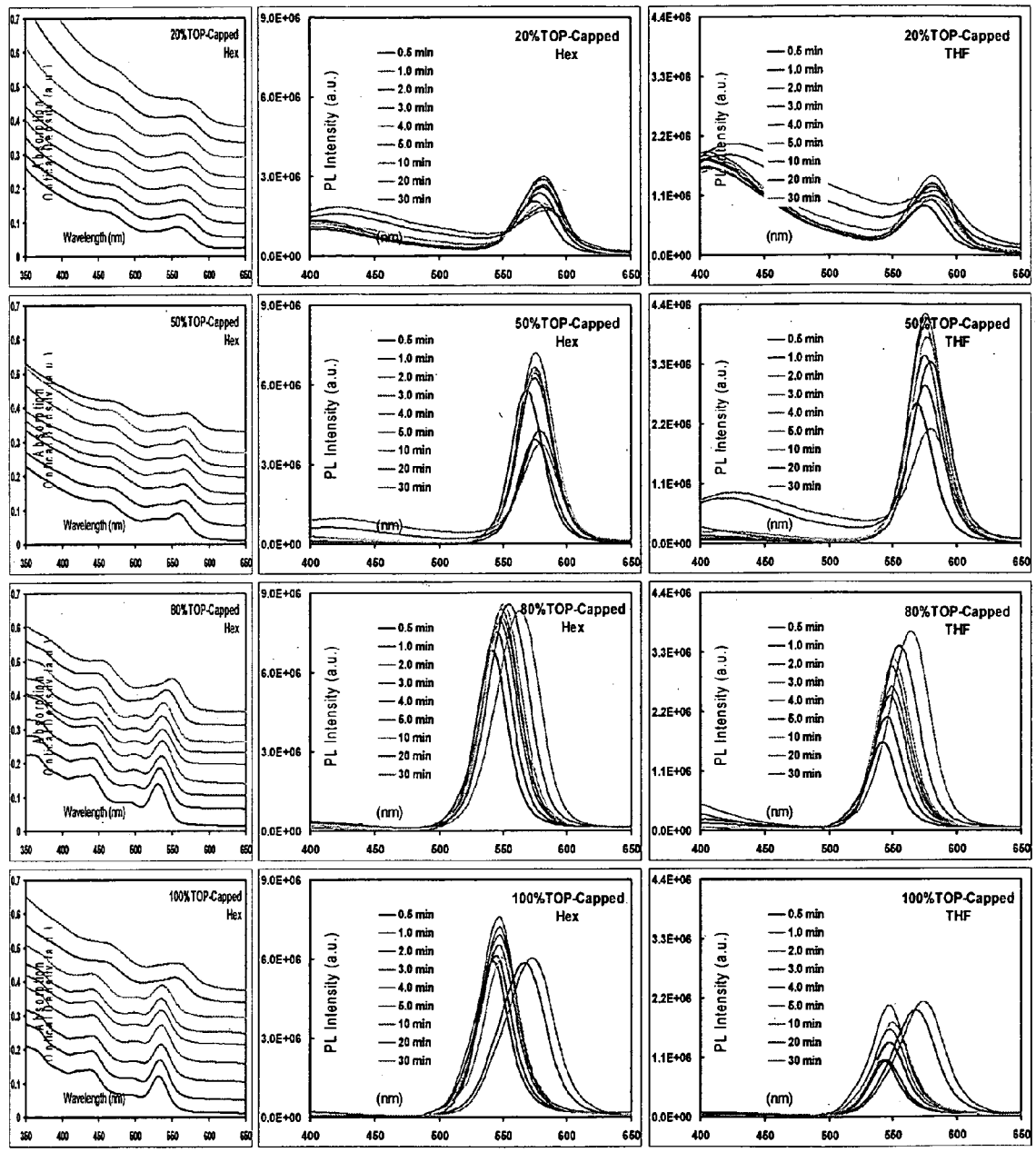
FIG. 27 shows the reaction media effect for 2Cd-to1Se.
Figure 28:
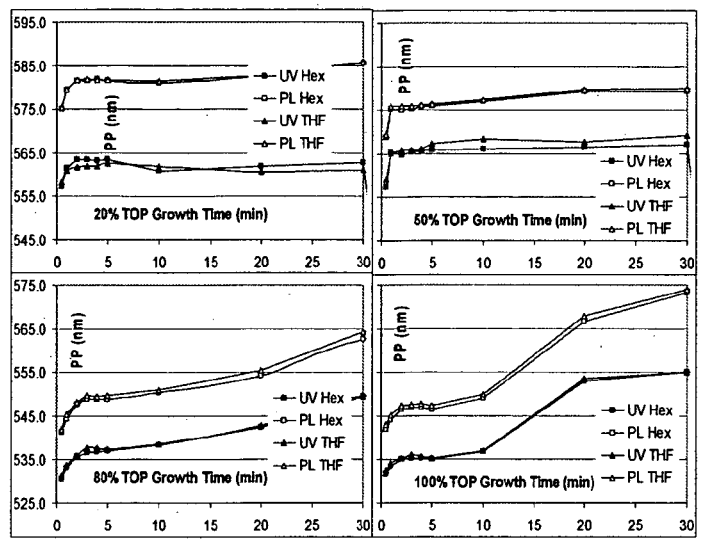
FIG. 28 shows the temporal evolution of the peak postions for 2Cd-to1Se.
Figure 29:
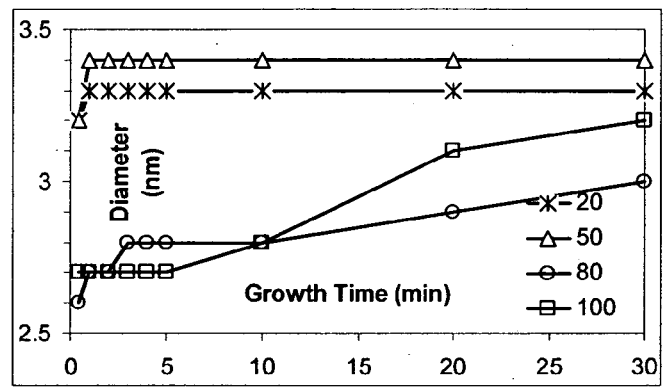
FIG. 29 shows the effect on size of the nanocrystals for 2Cd-to1Se.
Figure 30:
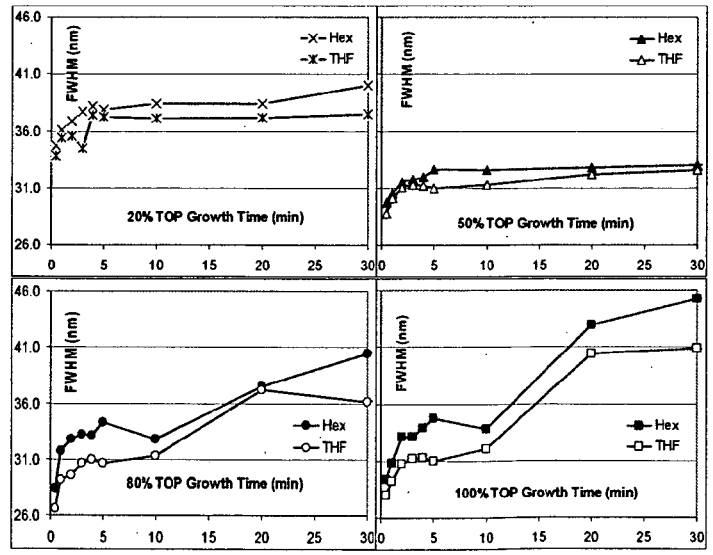
FIG. 30 shows the FWHM for 2Cd-to1Se.
Figure 31:
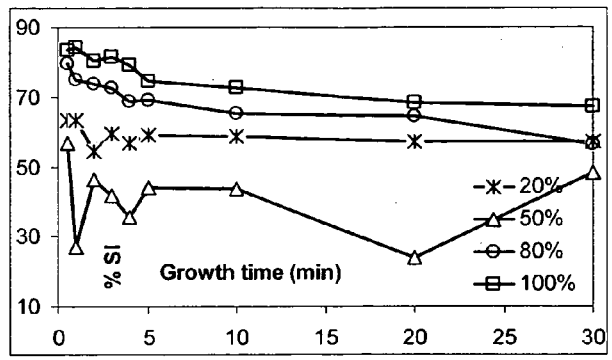
FIG. 31 shows the sensitivty index for 2Cd-to1Se.
Figure 32:
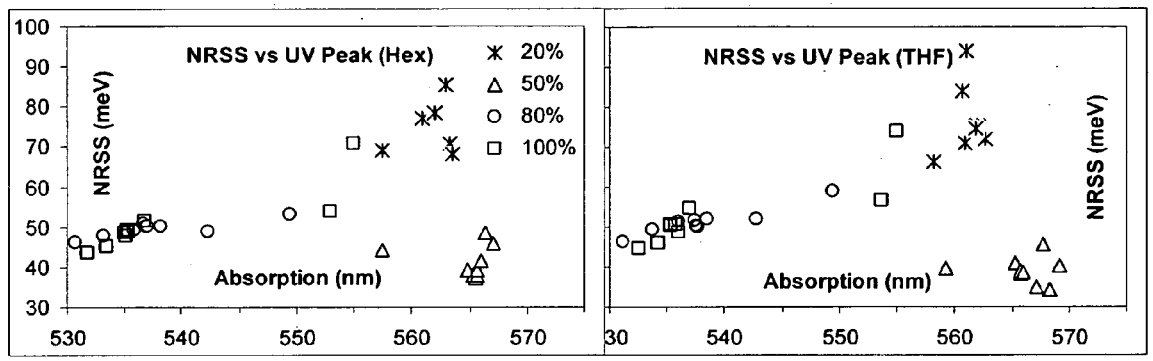
FIG. 32 shows the non-resonant Stokes shifts for 2Cd-to1Se.

In order to have a comprehensible comparison of the experimental data with those calculated theoretically, the NRSS versus absorption peak is shown in FIG. 26 for the nanocrystals from the syntheses with 2, 4, and 6Cd:1Se molar ratios. It is clear that the Cd-to-Se molar ratio has a significant effect on the NRSS of the same-sized nanocrystals; however, the present experimental data fall into the theoretical range. The reason for the 6Cd-to-1Se nanocrystals during 0.5-20 min growth periods exhibiting the decrease of the NRSS may be related to the fact that there is little change in the FWHM (FIG. 2 and Table 3). Thus, the insensitivity of the NRSS to the dispersed environment as well as the values that agree with those calculated theoretically may be included as additional parameters to estimate the surface quality of nano-crystals. Therefore, regarding the NRSS, the syntheses with 4Cd-to-1Se and 6Cd-to-1Se molar ratios are better than others for ensuring high quality CdSe nanocrystals.

It will be seen that a rational Cd-to-Se molar ratio is found in the range of 2-6, based on the observation of the limited change in both size and size distribution with growth time, and good optical properties. A parameter, the redshift rate of the band-edge absorption and emission peak positions during growth, is proposed to estimate the growth rate in size of the growing nanocrystals. Zero growth rate is achieved from the 2Cd-to-1Se synthesis. Furthermore, the growing nanocrystals from the 4 or 6Cd-to-1Se molar ratios exhibit almost constant PL intensity in Hex but an enhancement in THF. Regarding the NRSS and the temporal evolution of the PL intensity, a rational Cd-to-Se molar ratio is on the order of 4-6 only. The current synthetic route enables us to accomplish large-scale production of CdSe nanocrystals with a high degree of synthetic reproducibility and excellent PL properties: this is achieved with a low growth rate to give a product high PL efficiency.

With cadmium oxide (CdO) as the Cd precursor and tri-n-octylphosphine selenide (TOPSe) as the Se source, TOP-capped and TOP-tri-n-poctylphosphine oxide (TOPO)-capped CdSe nanocrystals were synthesized without the use of an acid. The synthetic approach was the addition of a TOPSe/TOP solution into a CdO solution in TOP with or without TOPO at one temperature (300° C.), with subsequent growth at a lower temperature (250° C.). The temporal evolution of the optical properties, including absorption and luminescence (PL), of the growing nanocrystals was monitored in detail. A comprehensive examination on the control of the optical properties was performed by systematically varying the TOP/TOPO weight ratio of the reaction media. Surprisingly, a rational choice of a 100% TOP or 80% TOP was found, under the Present Experimental Conditions and Growth-Time Scale (PECGTS) monitored, mainly based on that the growing nanocrystals exhibited sharp features and rich substructure in their absorption spectra, as well as sharp features in their emission spectra with narrow full width at half maximum (FWHM). In addition, the growth kinetics and optical sensitivity arising from the nanocrystals dispersions on going from non-polar hexanes (Hex) to polar tetrahydrofuran (THF) were studied. The results are shown in FIGS. 27 to 33.

Figure 33:
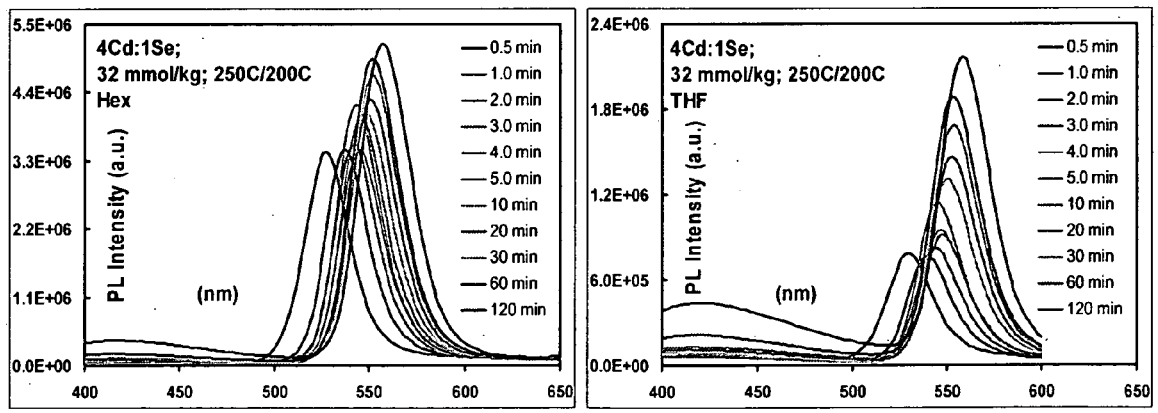
FIG. 33 shows the effect of temperature with 4Cd-to1Se.
Figure 34:
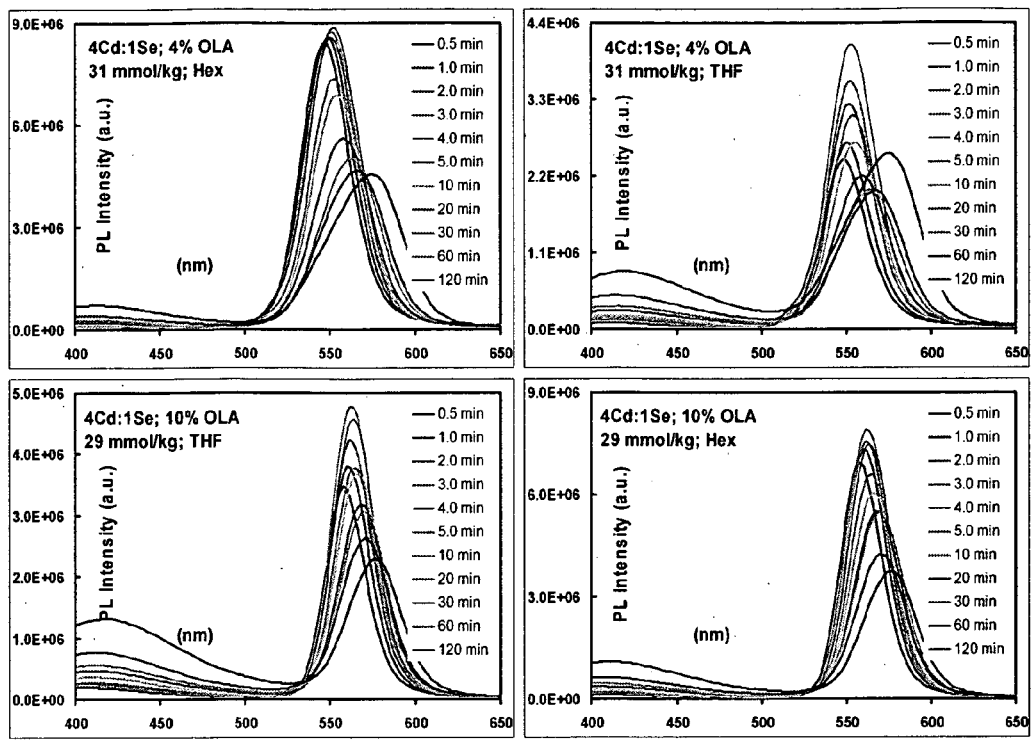
FIG. 34 shows the additive effect of the amine (OLA, oleylamine) at 300 C/250° C. with 4Cd-to1Se.
Figure 35:
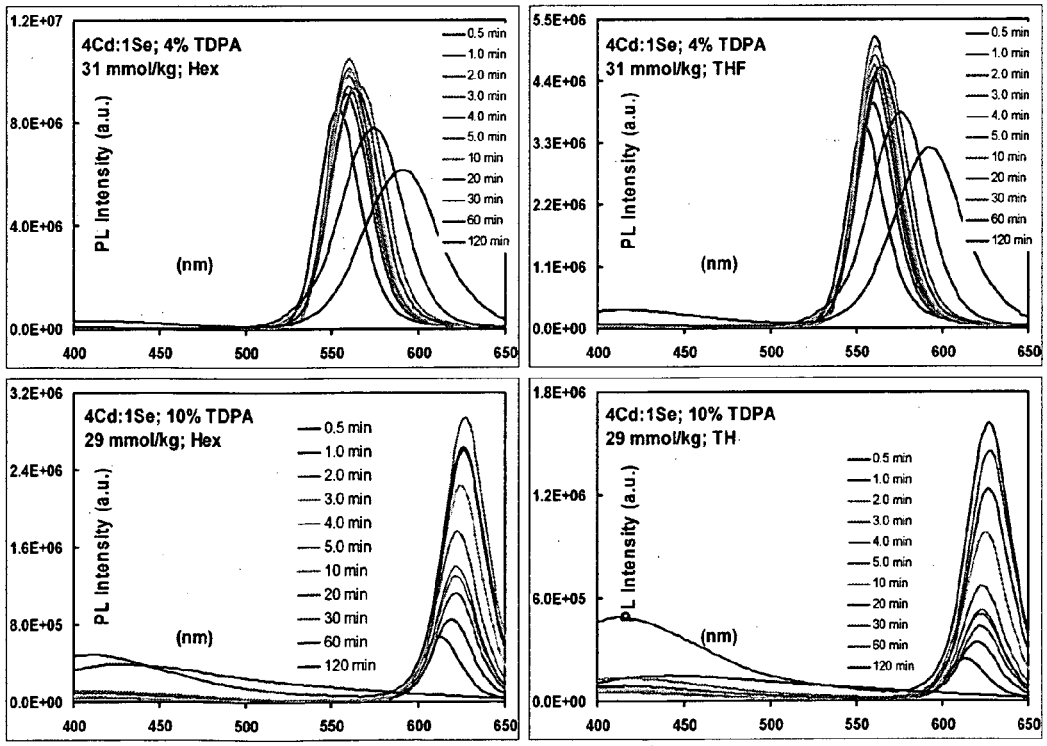
FIG. 35 shows the additive effect of the acid (TDPA) 300 C/250° C. with 4Cd-to1Se.
Figure 36:
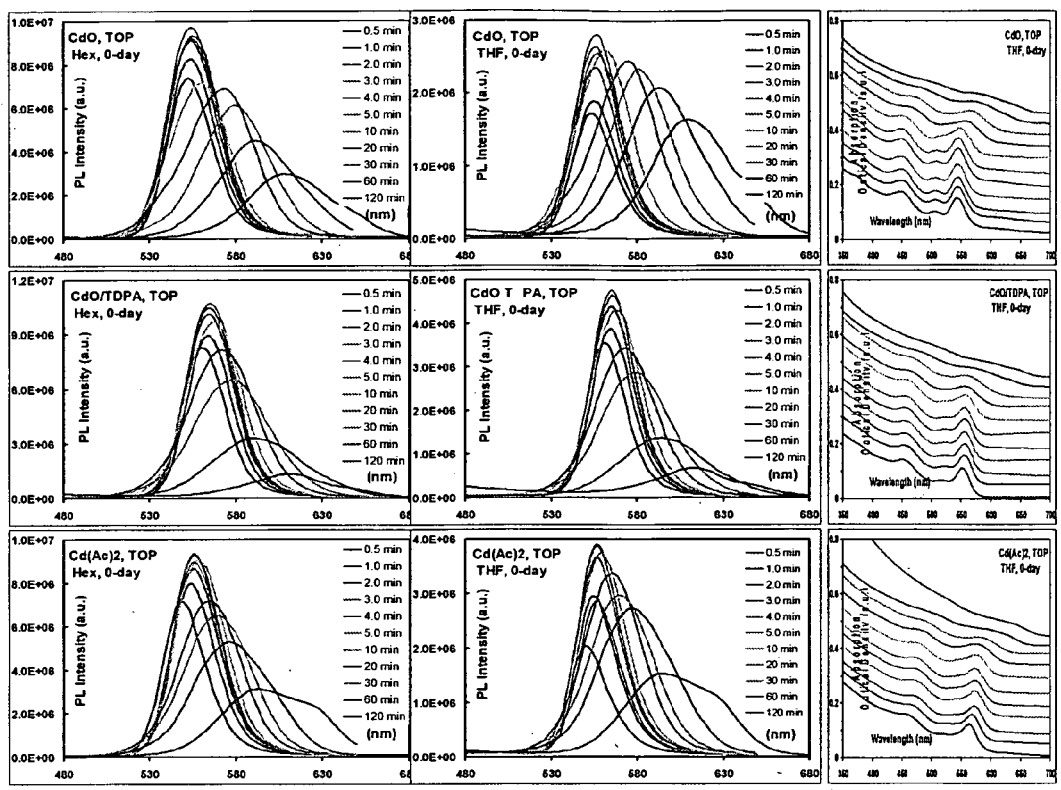
FIG. 36 shows the additive effect (4% TDPA) and different Cd precursor (Cd(Ac)2) effect for 2Cd-to1Se (300 C/250° C.
Figure 37:
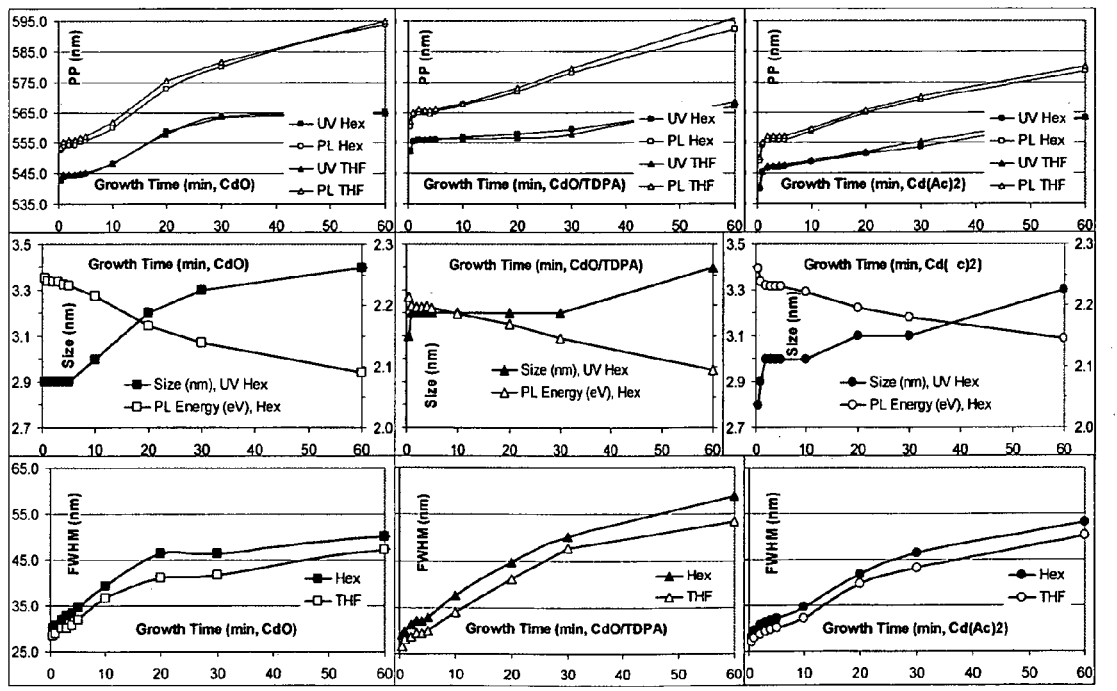
FIG. 37 shows the temporal evolution of the optical properties for 2Cd-to1Se (300 C/250° C.
Figure 38:
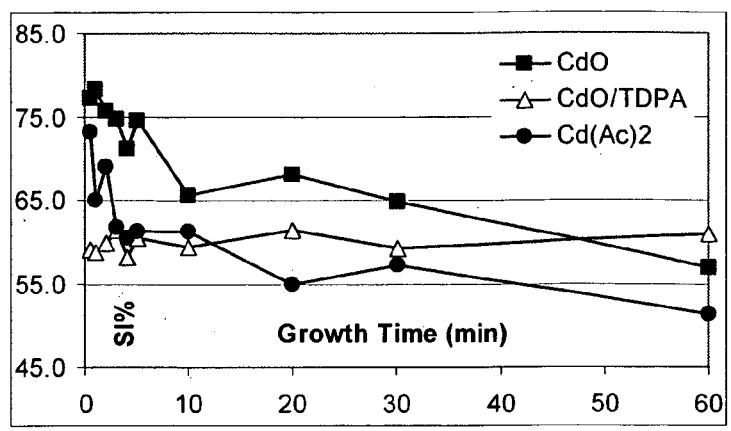
FIG. 38 shows SI and NRSS for 2Cd-to1Se (300 C/250° C.)
Figure 38:
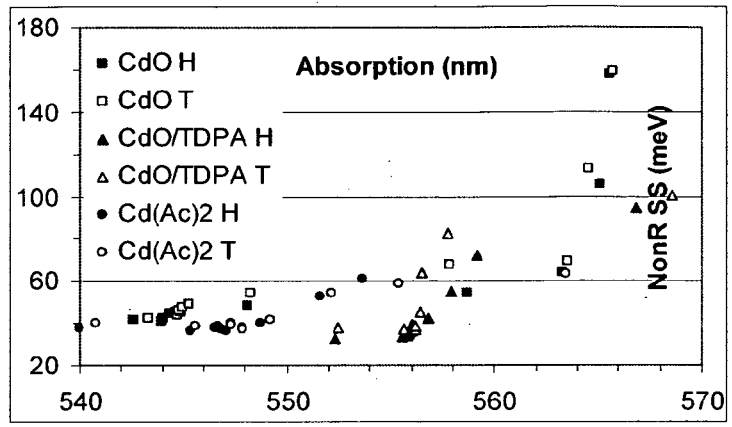
Figure 39:
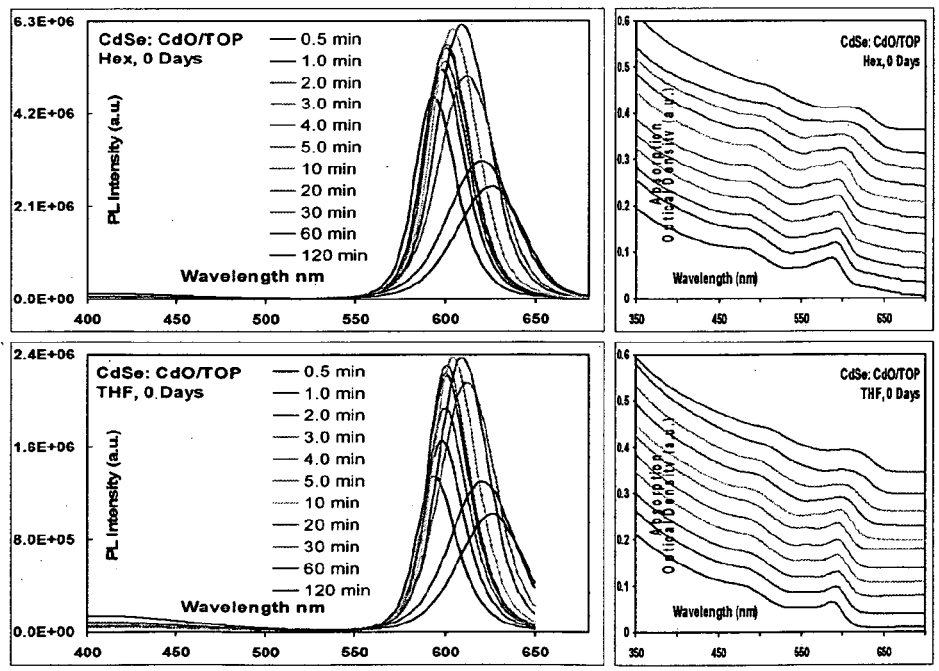
FIG. 39 shows the concentration effect for 2Cd-to1Se (300 C/250° C.)

Studies were carried out on the effect of temperature on 4Cd-to1Se. The results are shown in FIG. 33. Studies were also carried out on the additive effect of the amine (OLA, oleylamine) at 300 C/250° C. with 4Cd-to1Se. FIG. 35 shows the additive effect of the acid (TDPA) at 300 C/250° C.

Figure 40:
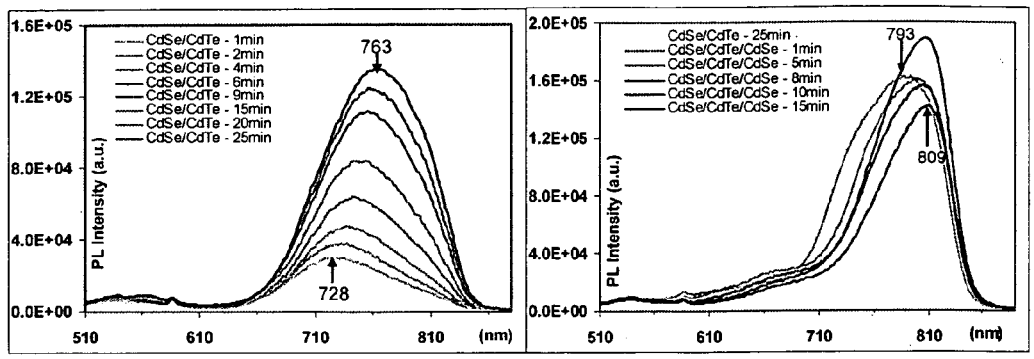
FIG. 40 shows the emission spectra for layered structures consisting of a core and one or more shells.

Further studies were carried out on layered quantum dot structures. FIG. 40 shows the results for a quantum shell CdSe/CdTe (left) and quantum dot quantum well CdSe/CdTe/CdSe emission spectra (right) from a sequential addition of Se, Te, and Se synthesis. The CdSe core was formed by the molar ratio of Cd:Se of initially 4:1 and the reaction proceeded for 5 minutes before the sequential addition of Te and Se shell-precursor solutions. In this manner the starting cores were synthesized by the addition of a TOPSe/TOP solution (7.84 mg (0.10 mmol) Se/0.49 g TOP) into a CdO/TOP solution (50.94 mg (0.40 mmol) CdO/2.59 g TOP) at 300° C. with subsequent growth at 250° C. for ca. 5 minutes. After 5 minutes a CdTe shell was created by the injection of a TOPTe/TOP solution (1.41 mg (0.11 mmol) Te/0.36 g TOP). Upon initial injection of this room temperature solution the reaction temperature dropped, but after ca. 6 minutes the reaction temperature was again ca. 250° C. and subsequent growth was allowed for ca. 25 minutes. After growth of the CdTe shell for 25 minutes, a TOPSe/TOP solution (11.73 mg (0.15 mmol) Se/0.48 g TOP) was injected into the reaction flask, and subsequent growth of CdSe shell was allowed for ca. 20 minutes.

Figure 41:
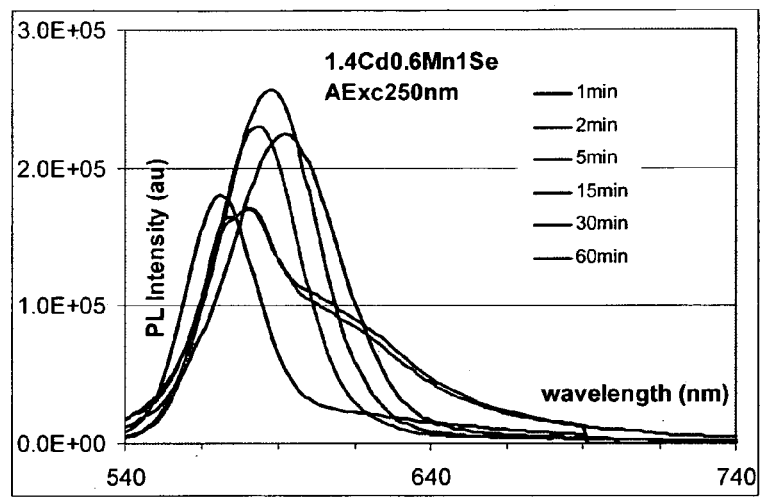
FIG. 41 shows the PL spectra for CdMnSe dots with different growth periods.

FIG. 41 shows the PL spectra of the CdMnSe dots with different growth periods from a xCd:yMn:zSe synthesis—4 mg Se (0.05 mmol) in TOP 0.2474 g as the injection solution. CdO 0.009 g and Mn(Ac)2 0.005 g in 1.37 g TOP.

Figure 42:
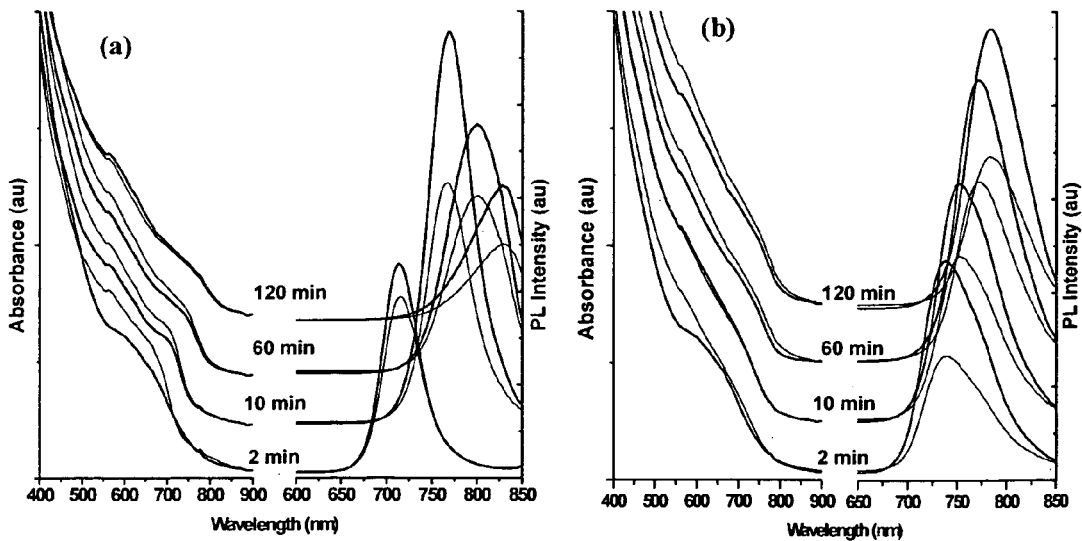
FIG. 42 shows the absorption and PL spectra ($\lambda_{ex}$=500 nm) of $CdSe_xTe_{1-x}$ nanocrystals synthesized under nitrogen dispersed in hexanes.

FIG. 42 shows the absorption and PL spectra ($\lambda_{ex}$=500 nm) of $CdSe_xTe_{1-x}$ nanocrystals synthesized under nitrogen dispersed in hexanes (thick lines) and THF (thin lines) synthesized using: (a) from a synthesis of with Cd:Te:Se=2:1:1 molar ratios and (b) from a synthesis with Cd:Te:Se=4:1:1 molar ratios. A typical procedure for the synthesis of the alloyed nanocrystals was carried out as follows: in a three neck round bottomed flask equipped with a gas inlet, a thermometer and magnetic stirrer, cadmium oxide was dissolved in trioctylphosphine (TOP) by heating slowly up to 320° C. over one hour, with the inlet opened to ambient atmosphere. After the precursor CdO completely dissolved in the ligating solvent, the reaction mixture became clear. The temperature was further stabilized at 300° C. and the gas inlet connected to nitrogen for the inert atmosphere syntheses or remained open to air for the air syntheses. The preparation of TOPSe/TOP and TOPTe/TOP solutions involved the dissolution of Se and Te metal in TOP at 40° C., by sonication. These freshly prepared solutions were mixed and injected quickly (5 sec) into the CdO-TOP precursor solution at 300° C. to induce efficient nucleation. Different molar ratios of CdO to the total moles of counterions (Se and Te) were used i.e. Cd:Te:Se=4:1:1, 2:1:1 and 1:1:2. The growth of the alloyed nanocrystals was conducted at 250-260° C., both in air and in inert atmosphere, for typically two hours.

The alloyed dots can also be synthesized with different zCd:xSe:yTe, with x≠y. For a 4:1:1 synthesis: make solutions of 12.85 mg Te in 0.755 g TOP, and 7.73 mg Se in 0.467 g TOP. Mix the two solutions to be injected. Then 49.30 mg CdO in 1.778 g TOP. For a 2:1:1 synthesis: make solutions of 12.85 mg Te in 0.755 g TOP, and 7.73 mg Se in 0.467 g TOP. Mix the two solutions to be injected. Then 24.65 mg CdO in 1.778 g TOP.

Figure 43:
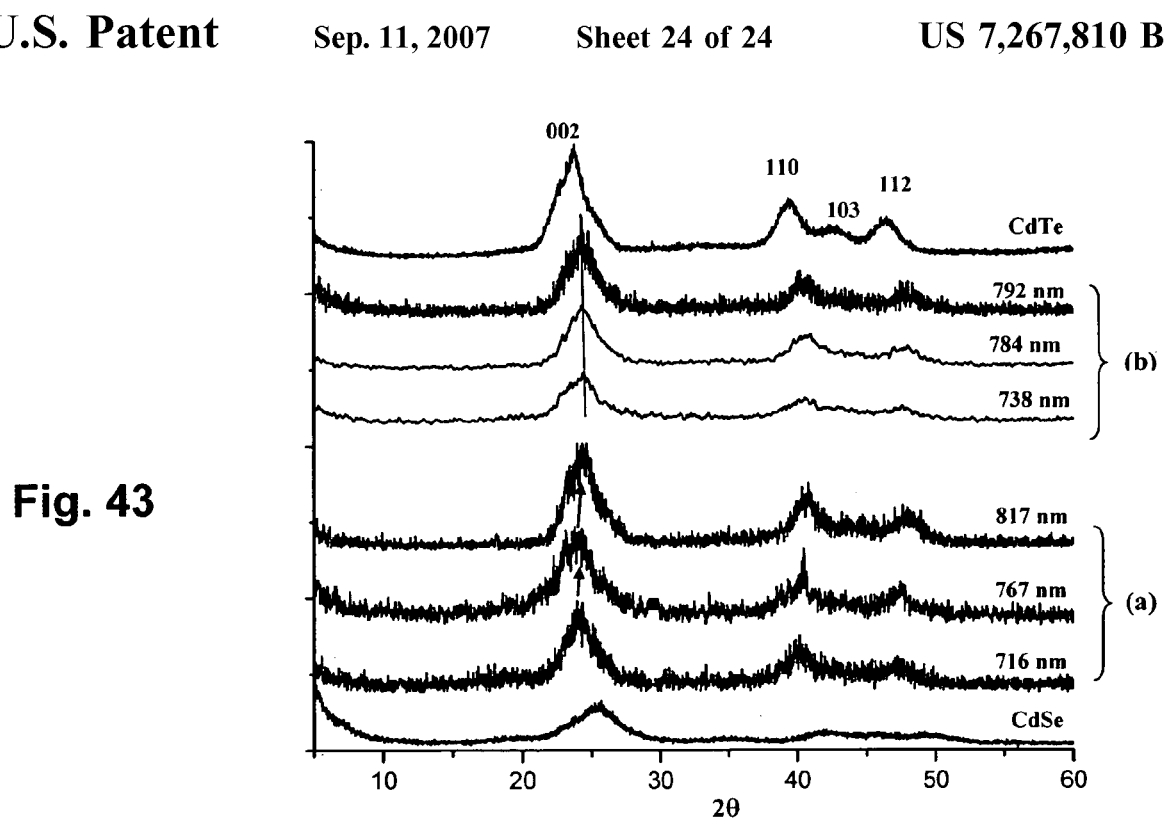
FIG. 43 shows the powder X-ray diffraction patterns of ternary alloyed nanocrystals having different PL emission maxima and comparison with those of pure CdSe, CdTe nanocrystals.

FIG. 43 shows the powder X-ray diffraction patterns of ternary alloyed nanocrystals having different PL emission maxima and comparison with those of pure CdSe, CdTe nanocrystals: (a) CdSeTe alloyed quantum dots from a 2Cd1Se1Te synthesis and (b) CdSeTe alloyed quantum dots from a 4Cd1Se1Te synthesis.

Figure 44:
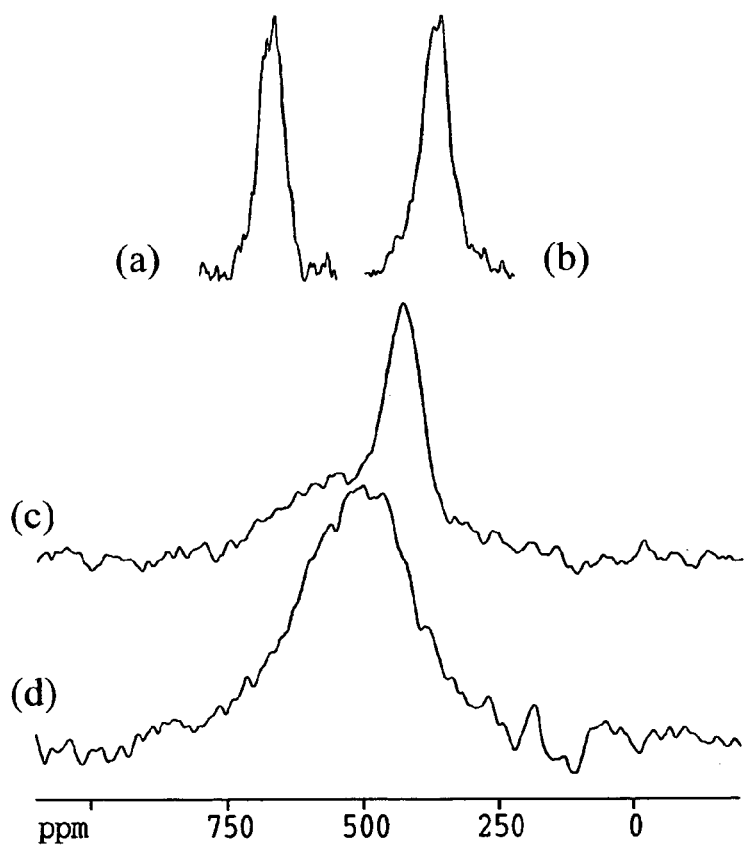
FIG. 44 shows a comparison between the CP MAS $^{113}$Cd NMR spectra of the (a) pure CdSe and (b) CdTe nanocrystals and (c) CdSeTe alloyed quantum dots.

FIG. 44 shows a comparison between the CP MAS $^{113}$Cd NMR spectra of the (a) pure CdSe and (b) CdTe nanocrystals and (c) CdSeTe alloyed quantum dots from a 2Cd1Se1Te synthesis and (d) CdSeTe alloyed quantum dots from 4Cd1Se1Te synthesis. The dots were synthesized from our one-component approach using TOP as the reaction media.

We claim:

1. A method of making nanocrystals comprising:
preparing a chalcogen source consisting essentially of a first complex of a chalcogen and a ligand solvent, said first complex being dissolved in said ligand solvent;
preparing at least one cation source consisting essentially of a second complex of a metal-containing non-organometallic precursor compound and said ligand solvent, said second complex being dissolved in said ligand solvent;
subsequently adding said at least one chalcogen source to said at least one cation source at a first temperature in the range of 200-300° C. to form a nanocrystal precursor solution consisting essentially of said chalcogen source and said cation source in the absence of a further ligand solvent; and
growing said nanocrystals in said nanocrystal precursor solution at a second temperature lower than said first temperature.

2. The method of claim 1, wherein said ligand solvent is a phosphine-based solvent.

3. The method of claim 2, wherein said ligand solvent is tri-octyl phosphine.

4. The method of claim 3, wherein said metal-containing non-organometallic precursor compound is selected from the group consisting of metal oxides and metal salts.

5. The method of claim 4, wherein the chalcogen is selenium.

6. The method of claim 1, wherein said first complex is TOPSe and said second complex is CdO/TOP, said ligand solvent being TOP, where TOP is tri-octyl phosphine.

7. The method of claim 1, wherein said second temperature lies in the range 175-300° C.

8. The method of claim 1, wherein the metal in said metal-containing non-organometallic metal precursor compound is selected from the group consisting of Cd, Zn, Mg, Hg, Cu, Ag, Ni, Co, Fe, Mn, Ti, Zr, Al, Ga, In, Sn, Pb.

9. The method of claim 1, comprising determining the qualities of the nanocrystals by controlling at least one parameter selected from the group consisting of temperature, the ratio of metal to chalcogen, and the concentration of said metal-containing non-organometallic precursor compound.

10. The method of claim 1, wherein a first said chalcogen source is added to said first ligand solvent to grow a core of a first chalcogenide, and subsequently a second said chalcogen source is added to said first ligand solvent to grow a shell of a second chalcogenide around said core.

11. The method of claim 10, wherein said core is CdTe, and said shell is CdSe.

12. The method of claim 1, wherein said chalcogen source is added to a mixture of at least two metal-containing non-organometallic precursor compounds in said first ligand solvent to produce nanocrystals consisting of an alloy of said metals.

13. A method of making nanocrystals comprising:
preparing a chalocogen source consisting essentially of a first complex of a chalcogen and a first ligand solvent, said first complex being dissolved in a solution of said first ligand solvent;
preparing a cation source consisting essentially of a second complex of a metal-containing non-organometallic precursor compound and a second ligand solvent, said second complex being dissolved in said second ligand solvent, said second ligand solvent being different from said first ligand solvent;
subsequently adding said chalcogen source to said cation source at a first temperature in the range of 200-300° C. to form a nanocrystal precursor solution consisting essentially of said chalcogen source and said cation source in the absence of a further ligand solvent; and
growing said nanocrystals in said nanocrystal precursor solution at a second temperature lower than said first temperature.

14. The method of claim 13, wherein said first ligand solvent is an alkyl phosphine solvent.

15. The method of claim 14, wherein said second ligand solvent is an alkyl phosphine oxide solvent.

16. The method of claim 15, wherein the chalcogen is selenium.

17. The method of claim 13, wherein said chalcogen source is TOPSe, where TOP is tri-octyl phospine.

18. The method of claim 17, wherein said second ligand solvent is TOPO, where TOPO is tri-octyl phospine oxide.

19. The method of claim 18, wherein said metal-containing non-organometallic precursor compound is CdO.

20. The method of claim 19, wherein said second temperature lies in the range 175-300° C.

21. The method of claim 13, wherein the metal is selected from the group consisting of Cd, Zn, Mg, Hg, Cu, Ag, Ni, Co, Fe, Mn, Ti, Zr, Al, Ga, In, Sn, Pb.

22. The method of claim 13, comprising determining the qualities of the nanocrystals by controlling at least one parameter selected from the group consisting of temperature, the ratio of metal to chalcogen, and the concentration of said metal-containing non-organometallic compound.

23. A method of making nanocrystals comprising:
preparing a chalocogen source consisting essentially of a first complex of a chalcogen and a first ligand solvent, said first complex being dissolved in a solution of said first ligand solvent;
preparing a cation source consisting essentially of a second complex of a metal-containing non-organometallic precursor compound and a second ligand solvent, said second complex being dissolved in said second ligand solvent, said second ligand solvent being different from said first ligand solvent;
subsequently adding said chalcogen source to said cation source at a first temperature in the range of 200-300° C. to form a nanocrystal precursor solution consisting essentially of said chalcogen source and said cation source in the absence of a further ligand solvent; and
growing said nanocrystals in said nanocrystal precursor solution at a second temperature lower than said first temperature; and
wherein the growth of the nanocrystals is carried out in the absence of an acid.

* * * * *